United States Patent [19]

Liu et al.

[11] Patent Number: 5,434,404
[45] Date of Patent: Jul. 18, 1995

[54] LINEAR SCANNER APPARATUS FOR COMMUNICATING WITH A DATA CARD

[75] Inventors: Yiu T. Liu, Contra Costa County; Lang V. Nguyen, Santa Clara County; Joseph Y. Kwong, Santa Clara County; Stanley Y. W. Lui, Santa Clara County, all of Calif.

[73] Assignee: Verifone, Inc., Redwood City, Calif.

[21] Appl. No.: 775,738

[22] Filed: Oct. 11, 1991

[51] Int. Cl.⁶ .................... G06K 13/00; G07B 15/02
[52] U.S. Cl. .................................... 235/475; 235/476; 235/477; 235/384
[58] Field of Search ............. 235/477, 384, 475, 476, 235/449

[56] References Cited

U.S. PATENT DOCUMENTS

| | | | |
|---|---|---|---|
| 3,560,715 | 2/1971 | Akamatsu | 235/61.8 |
| 3,602,695 | 8/1971 | Boss | 235/61.7 |
| 3,706,860 | 12/1972 | Burbank, III | 235/449 |
| 3,774,743 | 11/1973 | Hendrickson | 194/4 C |
| 3,786,421 | 1/1974 | Wostl et al. | 235/61.1 B |
| 3,826,344 | 7/1974 | Wahlberg | 194/2 |
| 3,836,753 | 9/1974 | Pass | 235/61.11 D |
| 3,872,438 | 3/1975 | Cuttill et al. | 235/61.11 H |
| 3,935,933 | 2/1976 | Tanaka et al. | 235/61.7 B |
| 4,020,325 | 4/1977 | Pfost et al. | 235/61.7 B |
| 4,048,475 | 9/1977 | Yoshida | 235/61.7 B |
| 4,151,564 | 4/1979 | Schreiber et al. | 360/2 |
| 4,216,506 | 8/1980 | Ludtke et al. | 360/74.1 |
| 4,271,351 | 6/1981 | Bloodworth | 235/375 |
| 4,300,042 | 11/1981 | Oldenkamp et al. | 235/449 |
| 4,361,754 | 11/1982 | Hoskinson et al. | 235/381 |
| 4,476,507 | 10/1984 | Koike et al. | 360/104 |
| 4,513,199 | 4/1985 | Sidline | 235/449 |
| 4,518,852 | 5/1985 | Stockburger et al. | 235/381 |
| 4,527,052 | 7/1985 | Kilborn | 235/485 |
| 4,581,523 | 4/1986 | Okuno | 235/479 |
| 4,599,510 | 7/1986 | Barth et al. | 235/449 |
| 4,616,128 | 10/1986 | Case | 235/475 |
| 4,669,596 | 6/1987 | Capers et al. | 235/381 |
| 4,752,676 | 6/1988 | Leonard et al. | 235/379 |
| 4,788,420 | 11/1988 | Chang et al. | 235/483 |
| 4,803,349 | 2/1989 | Sugimoto et al. | 235/475 |
| 4,812,632 | 3/1989 | Kakinuma et al. | 235/479 |
| 4,833,310 | 5/1989 | Shimamura et al. | 235/479 |
| 4,837,426 | 6/1989 | Pease et al. | 235/440 |
| 4,847,475 | 7/1989 | Watabe et al. | 235/485 |
| 4,861,974 | 8/1989 | Kondo et al. | 235/475 |
| 4,879,607 | 11/1989 | Redemacher | 235/449 |
| 4,879,744 | 11/1989 | Tasaki et al. | 235/380 |
| 4,900,908 | 2/1990 | Tsutsui | 235/475 |
| 4,906,988 | 3/1990 | Copella | 235/440 |
| 5,019,696 | 5/1991 | Chang et al. | 235/436 |
| 5,175,423 | 12/1992 | Kayan | 235/477 |
| 5,225,666 | 7/1993 | Amarena et al. | 235/475 |

FOREIGN PATENT DOCUMENTS 1173540 8/1984 Canada .
3142310 6/1982 Germany .

OTHER PUBLICATIONS

U.S. Application Ser. No. 07/694,944 filed May 9, 1991 Co-Pending application. Not issue. Applicant Helmut L. Kayan, Rotary Data Card Scanning Apparatus U.S. Pat. No. 5,175,423, Dec. 29, 1992.
VeriFone, Inc.—TRANZ 330 Reference Manual, TRANZ 330 Reference Manual.
MARS Electronics Marketing Brochure, Presenting MARS Multicard.
MARS Electronics Marketing Brochure, Cashless Vending–Multicard MS 5504/10, 4 & 10 Price Controllers.

Primary Examiner—Timothy P. Callahan
Assistant Examiner—Trong Phan
Attorney, Agent, or Firm—Flehr, Hohbach, Test, Albritton & Hergert

[57] ABSTRACT

Apparatus for scanning a data card which comprises a thin, flexible medium having leading and trailing edges and one or more data stripes formed thereon at a prearranged location and extending transverse to said leading and trailing edges. The apparatus comprises a card guide for defining a linear card guide path and an entrance slit for accepting the data card into the guide path. A card positioning assembly is cooperatively associated with the card guide and drives the data card through the entrance slit and into the card guide. The card positioning assembly positions the card in a stationary prearranged location. A transducer positioning assembly linearly scans transducers along the data stripes on the data card.

26 Claims, 24 Drawing Sheets

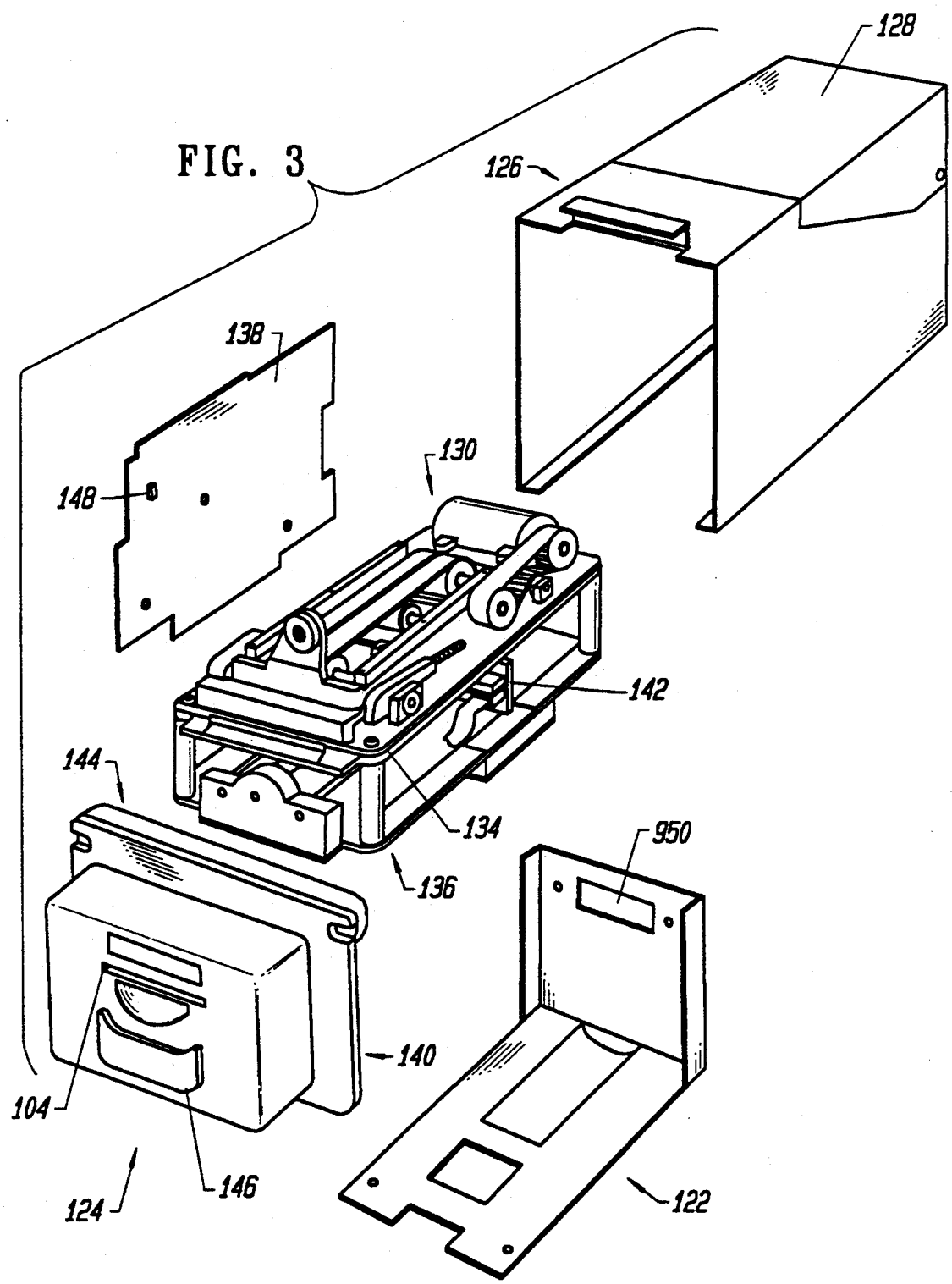

LINEAR SCANNER APPARATUS FOR COMMUNICATING WITH A DATA CARD

CROSS-REFERENCE TO RELATED APPLICATIONS

Following applications assigned to the same assignee are incorporated herein by reference: Ser. No. 07/775,736, Entitled "System and Method for Dispensing and Revaluing Cash Cards"; U.S. Pat. No. 5,291,003, Entitled "Modular Cash Card System Design"; and Ser. No. 07/775,266, Entitled "Dispensing Machine with Data Card Scanner Apparatus and Enhanced Features" all filed Oct. 11, 1991.

FIELD OF THE INVENTION

This invention relates generally to data card scanning systems and more specifically to apparatus for communicating with data cards having various thicknesses using a scanner having a linear scanning motion.

BACKGROUND OF THE INVENTION

Apparatus for automatic scanning of data cards is useful in many fields; for example, card readers in automated teller machines, and card reader/writers employed in vending machines or transportation access turnstiles are employed to read prepaid cards. In the prior art, automated data card scanning apparatus has generally been of the fixed transducer, linear card motion scanning variety and a number of different design approaches have been used in the art.

Fully automated data card scanners use a card transport mechanism to pull the data card into the reader and then drive the card over stationary read or read/write heads. Alternatively, a separate transport mechanism is utilized to drive the read/write heads over the data stripes on the data card after the data card has been inserted manually by the user.

Pass, U.S. Pat. No. 3,386,753, Pfost et al., U.S. Pat. No. 4,020,325, and Redemacher, U.S. Pat. No. 4,879,607 each illustrate a typical prior art linear card reader/writer apparatus in which a card transport mechanism drives the data card into the reader and past a stationary transducer assembly for reading the data on the card. After processing the data, the transport mechanism reverses to drive the card back out of the reader. Many other prior art patents show this type of reader structure. While these designs adequately handle the task of reading and writing data on a data card, they are typically bulky systems which require a significant volume of space in an overall machine in which they are used.

Other data card read/write systems use a card transport mechanism to pull the card into the system and to scan the card past read and write transducers with a single direction drive of the card to an exit slot remote from the card insert slot. These systems use a flexible card medium and typically the card path involves turning the card through a 90 degree angle between the entrance slot and the exit slot. These types of data card read/write systems have been used extensively in rapid transit system turnstiles.

Another type of automatic data card reader/writer system involves manual insertion of the card by the user into the read position; a transducer system is then scanned across the data stripe on the card. Killborn, U.S. Pat. No. 4,527,052 and Okuno, U.S. Pat. No. 4,581,523 are typical examples of this type of system.

Applications for automated magnetic stripe card read/write systems have expanded dramatically in the past several years. Many manufacturers of vending machines, laundry machines, telephone systems, and the like have an interest in using data card read/write systems in their machines, but find it difficult to adapt to the bulkiness and cost of the prior art apparatus which provides automated card handling. In most applications security dictates that the card disappear into the system during handling. Thus, manual card insertion systems are avoided whenever possible.

Additionally, data card read/write systems are currently designed for operation with a specific card design due to the wide variations in card thickness, e.g., a paper card for a transit system compared to a debit card for an ATM machine. Consequently, excessive design cost is incurred by the system manufacturer in developing a separate card scanner for each application. The extra cost is passed on to the customer.

Card swallow features are especially desirable in some applications, such as soft drink vending machines. Prepaid cards of the promotional variety need to be swallowed in order to track the amount of use that they are receiving. In other applications, it is desirable to swallow cards that have exhausted their value or that have been detected to be counterfeit or otherwise invalid for use in the machine. Including this feature in prior art read/write system typically adds extra volume which cannot be tolerated, especially if the extra volume is taken up in either width or depth of the apparatus.

Accordingly it can be readily appreciated that there is a need in the art for a data card scanner which is capable of performing fully automated transport through the read/write station, can accept a variety of thickness cards, can achieve enhanced security, and can incorporate a card swallow feature within a small additional volume.

In response to the need defined above, the principal object of the invention is to provide a linear scanner capable of reading and writing data from/to one or more data stripes on the data card.

Another objective of the present invention is to provide a linear scanner which includes apparatus for accepting a data card and positioning the card within the system to enable the transducers to be scanned along the data stripe or stripes on the card.

Another objective of the present invention is to provide a linear scanner that accepts a variety of card types and thicknesses.

Another objective of the present invention is to provide a linear scanner having improved security features.

Another objective of the present invention is to provide a linear scanner having a card swallow capability.

Another objective of the present invention is to provide a linear scanner that is constructed in a low-cost manner from mostly plastic components.

SUMMARY OF THE INVENTION

In summary, the invention comprises apparatus for scanning a data card in a linear fashion. The apparatus comprises a card guide for defining a linear card guide path and an entrance slit for accepting the data card into the guide path. The guide path is designed to automatically adjust for various thickness cards. A card positioning assembly is cooperatively associated with the card guide and drives the data card through the entrance slit and into the card guide. The card positioning assembly positions the card in a stationary prearranged location. A transducer positioning assembly linearly scans transducers along the data stripes on the data card.

A multi-scan process is used to read and write data from/to the data card to enhance security. Additionally, a shutter assembly closes the guide path as the card is drawn into the invention and remains closed during the scanning process. The shutter has an integral sensor which will cause the card to be ejected if an attempt is made at prying the shutter open during the scan process.

BRIEF DESCRIPTION OF THE DRAWINGS

The purposes and advantages of the present invention will be apparent to those skilled in the art from the following detailed description in conjunction with the drawings.

FIG. 3 is a partially exploded isometric view of FIG. 1;

DESCRIPTION OF THE PREFERRED EMBODIMENT

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
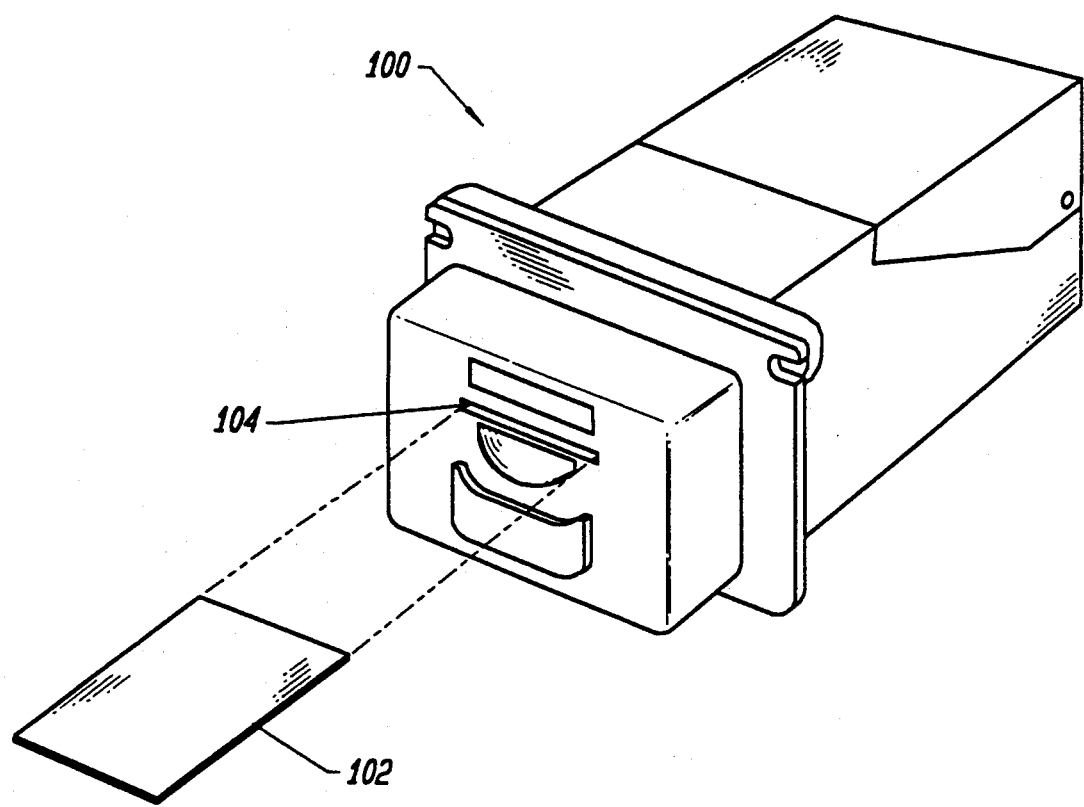
FIG. 1 iS an isometric view of data card scanning apparatus in accordance with this invention.

Referring to FIG. 1, a linear scanner apparatus 100 in accordance with this invention is adapted for reading and writing data from/to a data card 102. The scanner apparatus 100 accepts the data card 102 upon user insertion of the card 102 into entrance slit 104. The insertion of the card 102 triggers sensor apparatus which engages a mechanism that pulls the card through the entrance slit 104 and positions it within the mechanism for subsequent data reading and writing.

Figure 2A:
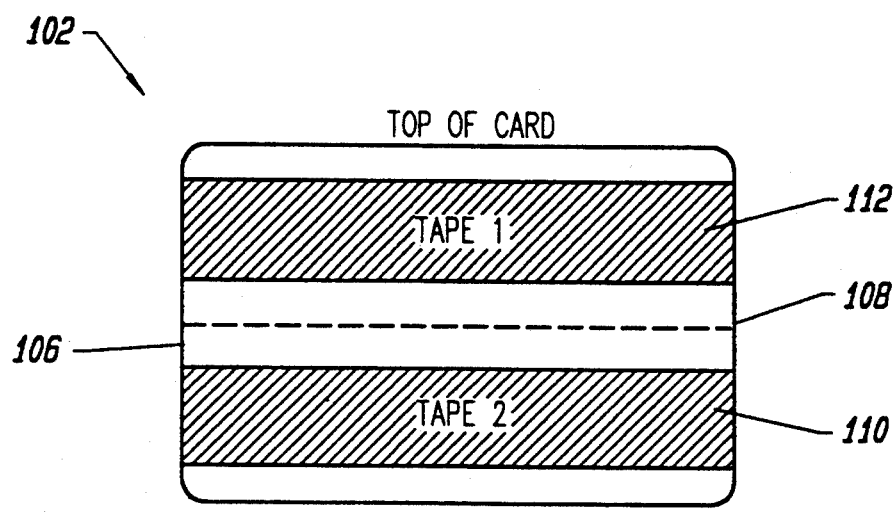
FIGS. 2A and 2B depict an exemplary data card having two data stripes.

Depicted in FIG. 2A is an exemplary data card formed from a thin, flexible medium, e.g, paper stock, plastic, mylar, etc. having leading 106 and trailing 108 edges. Generally, data cards vary in thickness between 8 and 40 mils depending upon the type of material used as base stock. However, the inventive concepts disclosed herein can be adapted by persons skilled in the art to accommodate data cards of any thickness. Data cards may vary in dimensions, but typically the cards are about the size of a credit or debit card, e.g., 3.375 by 2.125 inches.

Figure 2B:
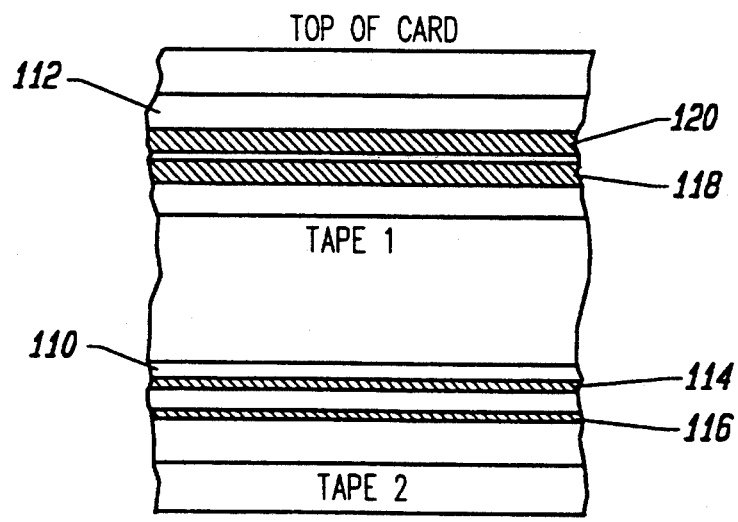

Between and perpendicular to card edges 106, 108 is disposed a pair of parallel magnetic data stripes or tapes 110, 112. Each stripe contains one or more data storage tracks. FIG. 2B depicts a card 102 having two stripes 110, 112 with two data tracks 114, 116, 118, 120 each. Typically, on a card which is used in a prepaid environment, i.e., for vending machine access, stripe 110 will contain security information in a form consistent with that which is available by license from Rand MeNally Corporation and is generally disclosed in U.S. Pat. Nos. 4,837,426 and 4,906,988, the disclosures of which are hereby incorporated by reference. Other forms of card security technology could also be readily implemented in the overall system of this invention.

In the vending machine application, stripe 112 will store card identification information on one track 120 and the card value is stored on the other track 118. Data stripe 112 contains data stored at any data rate which is necessary for a particular application. In a vending machine application, 105 bits/inch is used, but cards and readers storing as many as 210 bits/inch are available. Conceptually, the data card scanner disclosed herein is capable of writing any number of bits per inch by altering variables which are set within the system controller firmware. However, the hardware and firmware disclosed herein has a practical limit of approximately 210 bits/inch. Lesser bit rates are controlled by varying a variable in the firmware. Higher rates must be accommodated by making appropriate changes in the hardware and firmware which would be obvious to those skilled in the art.

By way of example, the encoding technique used is two frequency, coherent phase encoding, also referred to as F2F encoding. The information is stored as a pattern of flux reversals upon the data stripe. There are twice as many flux reversals for a logic ONE as there are for a logic ZERO. For instance, a track which is written at 105 bits per inch with only ONEs would contain 210 flux reversals per inch. In comparison, a card written at the same speed with all ZEROs would contain 105 flux reversals per inch. This format conforms with the general format used to store data upon credit cards except credit card data is written at a standard 75 bits per inch. The credit card standard is found in the American National Standard magnetic stripe encoding specification X4.16-1983 which is hereby incorporated by reference. That standard is available from the American National Standards Institute, Inc., 1430 Broadway, New York, N.Y. 10018. Other forms of encoding are useful in storing data upon a data card.

It should be understood that the invention is not limited to data cards having two magnetic stripes with two tracks each. The linear scanner of the invention can be used, with changes to the transducer arrangement and electronics that are readily understood by those skilled in the art, to communicate with any number of data stripes in combination with any number of data tracks. Additionally, it is foreseeable that the inventive arrangement described below could be used to read optically encoded data on a data card, e.g., bar coded data.

The basic elements of a linear data card scanner in accordance with the invention are encased in a plastic and sheet metal housing as depicted in FIG. 1. The overall dimensions of the apparatus is approximately 6.4 by 3.42 by 5.22 (L, W, H) inches and weighs approximately 2 lbs., 11 oz. As depicted in FIG. 3, the housing consists of four basic elements: base and back plates 122, a front panel 124, a main housing 126, and a hinged access cover 128.

As depicted in FIG. 3, the basic assemblies of the linear data card scanner 100 include a data card positioning assembly 130 for driving the data card 102 through an entrance slit 104 and into a card guide 134 and for positioning the data card in a prearranged position within the card guide 134, a transducer positioning assembly 136 for scanning the transducers along the data card 102 in a linear fashion, a plurality of circuit boards containing system control electronics 138, 140, 142, a display electronics assembly 144, and a user accessible interrupt button assembly 146. In accordance with one aspect of the invention, to simplify manufacturing and maintain low production costs, a majority of the structural components of the foregoing assemblies are constructed of injection molded plastic. Each of these assemblies will be explained in detail below.

Figure 4:
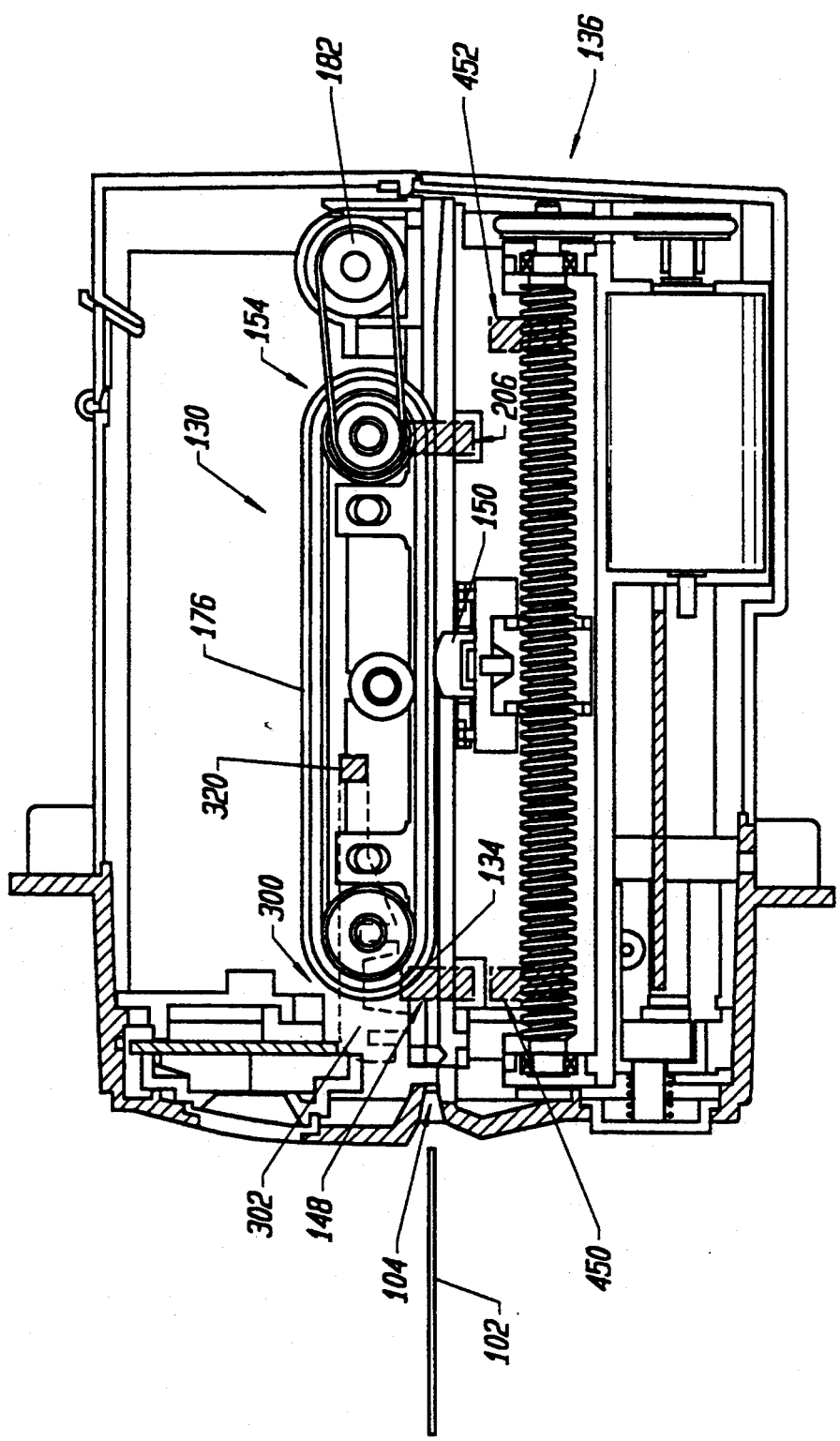
FIG. 4 is a cross-sectional view of a preferred embodiment of the invention depicted in FIG. 1.

In accordance with the general principals of operation of the invention and referring to FIG. 4, a data card 102 of any thickness between 8 and 40 mils is inserted into the entrance slit 104 and triggers a electro-optic sensor 148 that engages the card positioning assembly 130. The card 102 is drawn into a card guide 134 with a force of approximately 6 oz. and is positioned therein at a prearranged position. The transducer positioning assembly 136 scans transducers 150 in a linear fashion along the data stripes 110, 112 on the card 102. The data stored on the stripes 110, 112 is processed to determine the card's validity, identification and value. If the linear data card scanner 100 is used in a vending machine, the user's item selection is processed by the vending machine control system and the value of the item selected is deducted from the value currently stored on the data card 102. A new value is written on the card 102 and the card 102 is subsequently expelled from the entrance slit 104 by the card positioning assembly 130 such that the user may easily retrieve the card 102.

Figure 5:
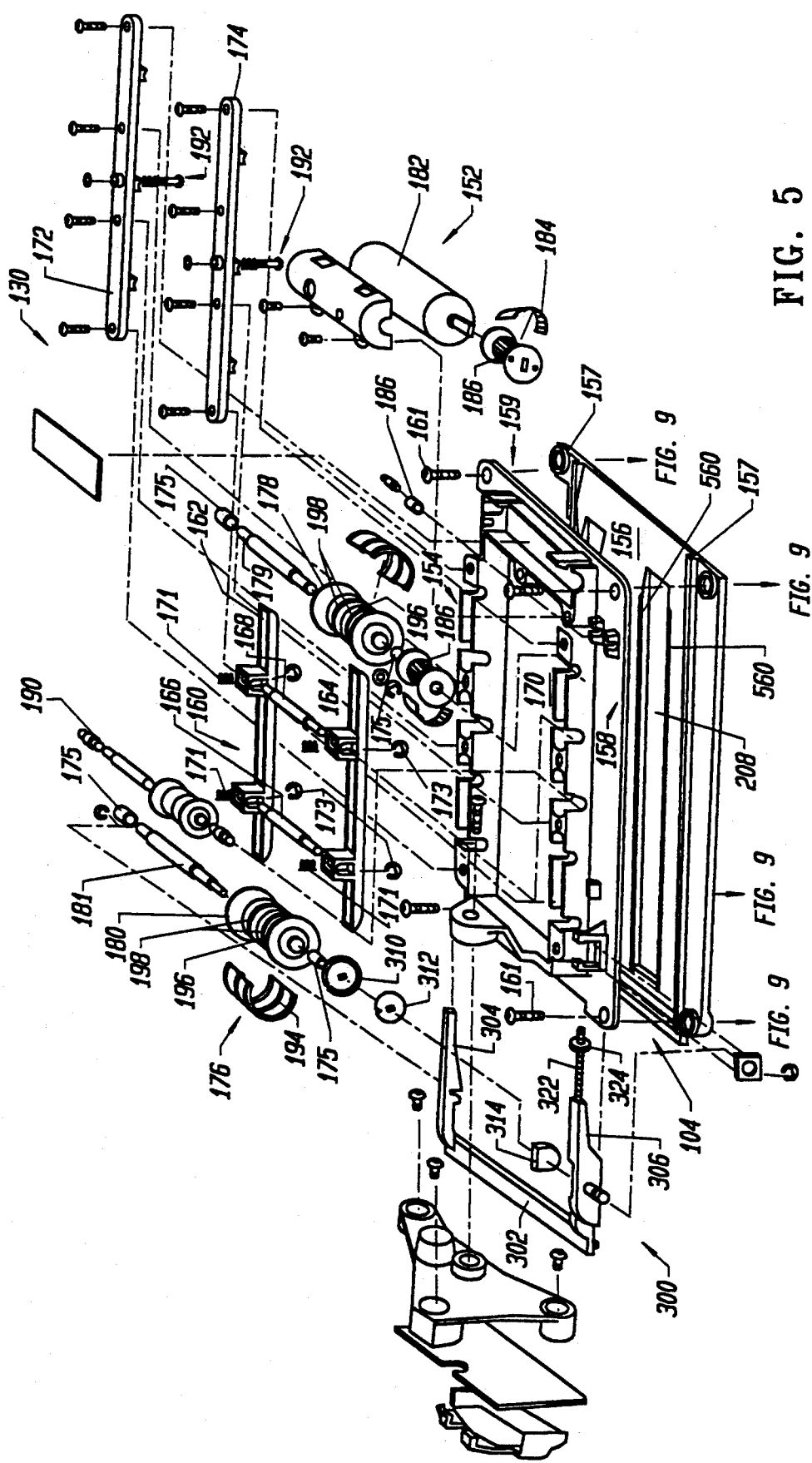
FIG. 5 is an exploded view of a data card positioning assembly in accordance with this invention.

In accordance with one aspect of the invention and as depicted in FIG. 5, a data card positioning means 130 is provided in assembly form having an entrance slit 104 with width and height dimensions slightly larger than the card 102, a drive means 152 for pulling the card 102 through the entrance slit and positioning it within a card guide means 154 for orienting the card such that the transducers 50 can detect the data stored thereon. The guide means 154 defines a card guide path 134 between a base plate portion 156 and a card positioning assembly frame 158 that will accommodate various thickness cards. The base plate portion 156 has two parallel raised walls 157 spaced such that a data card 102 will fit between them. The positioning assembly frame 158 defines a centrally located opening 70 and has a flat portion 159 surrounding the opening which rests against the raised walls 157. The base plate portion is attached to the positioning assembly frame by four corner screws 161. The base plate portion 156, the raised walls 157, and the flat portion of the positioning assembly frame 159 define the guide path 134 through which the card 102 travels.

To lessen the friction between the data card 102 and the base plate portion 156 which forms the bottom of the guide path 134, five parallel ribs 560 run substantially the length of the base plate portion 156. Two of the ribs 60 are depicted in FIG. 5. The data card 102 slides along the ribs 560 as it is pulled into the card positioning assembly 130.

Figure 6:
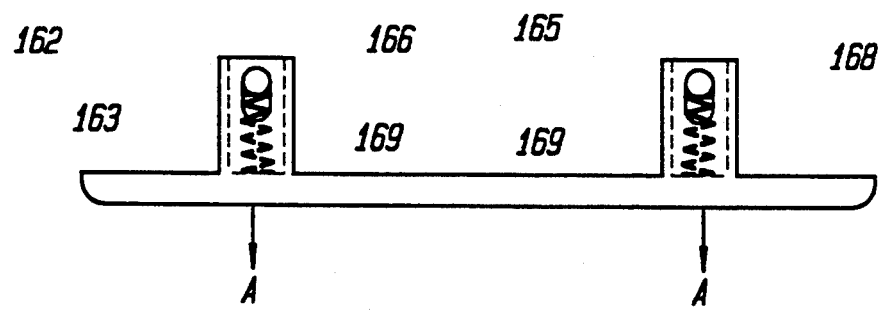
FIG. 6 depicts a portion of a pressure plate assembly.

Additionally, the card 102 is guided by a pressure plate assembly 160 shown in FIG. 5 as consisting of two parallel ski-shaped elements 162,164 mounted on a pair of shafts 166, 168. The ends of each shaft are captured by the positioning assembly frame 158 at each end and the ski-shaped elements 162,164 are disposed within centrally located opening 170. FIG. 6 depicts a side view of one of the ski-shaped elements 162. The shafts 166, 168 insert through the slots 163, 165 such that each ski-shaped element 162, 164 can move independently in a vertical direction. A compressed coil spring 169 is disposed between each shaft 166, 168 and the ski-shaped elements 162, 164, thus biasing the ski-shaped elements 162, 164 toward the guide path 134 as shown by arrows A.

Figure 7:
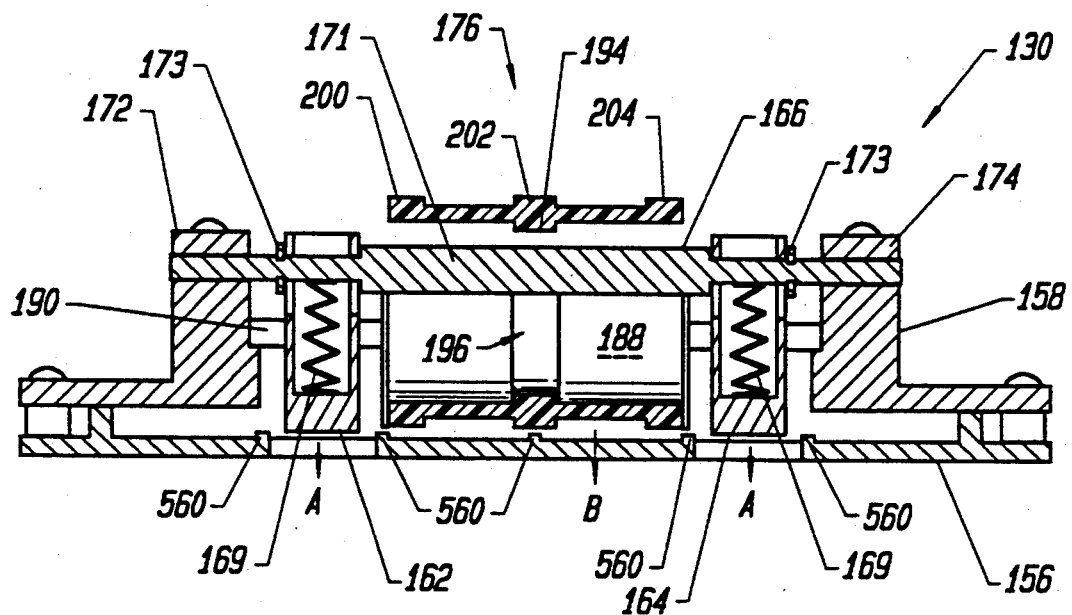
FIG. 7 is a cross-sectional view of a data card positioning assembly.

The mounting arrangement is best described with respect to FIG. 7, wherein a cross section of the card positioning assembly 130 is depicted. Each end of each mounting shaft 166, 168 (shaft 168 is not shown in FIG. 7) is captured between the positioning assembly frame 158 and the clamping rails 172, 174. The ski-shaped elements 162, 164 are restrained laterally by an increased diameter central section 171 of each shaft 166, 168 and a snap ring 173. The ski-shaped elements 162, 164 are spaced such that they are aligned with the standard spaced data stripes 110, 112 of an inserted card 102. The arrangement described ensures that each ski-shaped elements 162, 164 can freely and independently move in a vertical direction to adjust to the thickness of any card and also provide a biasing pressure upon the card 102 to press it flat against the ribs 560 of the base plate portion 156.

Referring to FIG. 5, the drive means 152 in the card positioning assembly 130 consists of a rubber (urethane) drive belt 176 which interacts with the data card 102 to move it through the entrance slit 104 and into the card guide path 134 towards a prearranged position. The drive belt 176 is positioned in the central opening 170 of the positioning assembly frame 158 between the ski-shaped elements 162, 164. The drive belt 176 circumscribes a pair of pulleys, the first being the drive pulley 178 and the second being the slave pulley 180. Each pulley is fixed to a shaft 179, 181 and the ends of each shaft is captured between the positioning means frame 158 and the clamping rails 172, 174. A teflon bushing 175 circumscribes each shaft end to reduce friction between the shafts 179, 181 and frame 158. The drive pulley 178 is driven by an electric motor 182, timing belt 184 and timing belt pulleys 186 arrangement as depicted.

TO provide tension on the drive belt 176 and bias it towards the data card 102 a tension pulley 188 is provided. The tension pulley 188 is mounted on a shaft 190 which is captured at each end by the positioning assembly frame 158 and biased by a coil spring assembly 192 captured between the shaft 190 and the clamping rails 172, 174.

Figure 8:
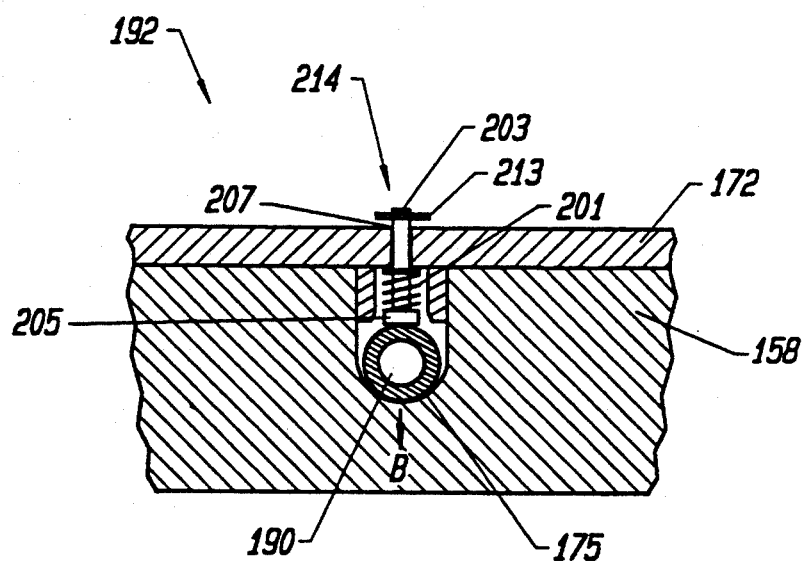
FIG. 8 is a cross sectional view of a drive belt tension pulley spring assembly.

As depicted in FIG. 8, the coil spring assembly 192 includes a partially compressed coil spring 201 wrapped about a plunger 211 having a stem 203 and a head 205. The stem 203 is circumscribed by the spring 201 and extends through a clamping rail 172 via a hole 207. The plunger 211 is held in place by a snap ring 213 at the distal end of the stem 203 relative to the head 205. The spring 201 is disposed between the head 205 and the clamping rail 172. The partially compressed spring 201 forces the head against a teflon bushing 175 that circumscribes the end of the shaft 190 and consequently biases the shaft 190 in the direction shown by arrow B. Each end of the shaft 190 is biased by a coil spring assembly 192 which forces the tension pulley 188 and drive belt 176 into the guide path 134. This arrangement is clearly shown in the cross section view of FIG. 7.

The combination of the spring biased pressure plate assembly 160 and the spring biased tension pulley 188 permits the positioning assembly 130 to accept and position cards of various thicknesses. Additionally, the arrangement ensures that warped cards are pressed flat against the ribs 560 of the base plate portion 156 during the transducer scanning process.

To provide enhanced traction between the drive belt 176 and the drive and slave pulleys 178, 180, a centrally located longitudinal rib 194 is formed on the inner surface of the drive belt 176 and a corresponding slot 196 is formed in each pulley's surface. FIGS. 5 and 7 depict this advantageous arrangement which increases the contact surface area between the pulleys 178, 180, 188 and the drive belt 176 to improve traction. In addition, two rubber bands 198 circumscribe the pulleys 178, 180 such that the rubber drive belt 176 interacts with the rubber bands 198 to improve traction as depicted in FIG. 5. Referring now to FIG. 7, to improve interaction between the drive belt 176 and the card 102, the drive belt 176 has formed on its outer surface three longitudinal ribs 200, 202, 204. One rib 202 is centrally located while the other two 200, 204 are positioned along the edges of the drive belt 176. Spacing of approximately 6.6 mm is established between the longitudinal ribs 200, 202, 204 such that the raised lettering of a credit or debit card is avoided by the ribs. Thus, the drive belt 176 contacts the card only along flat areas, avoiding the raised letters, to ensure optimal traction to move the card 102 into position.

The prearranged position at which the card is placed is determined by a pair of electro-optic sensors depicted in FIG. 4 as 134 and 206. The sensors are formed by a light emitting diode (LED) in a spaced, confrontational relation with a phototransistor encased in a single housing. This assembly is sold as a single part under the model number GP1L52 produced by Sharp, Inc. The housing is designed and the sensor is positioned to permit the card to pass between the LED and the phototransistor thus blocking the light and signalling that a card is present. The first sensor 134 detects the card insertion and begins the card positioning process, i.e., starts motor 182. A second sensor 206 determines when the card's leading edge 108 has attained the proper position, at that point the drive motor 182 is stopped. The pressure applied to the card 102 by the pressure plate assembly 160 and the drive belt 176 maintain the card 102 in a fixed position.

Once positioned, the transducers 150 are scanned along the length of the data stripes 110, 112 by the transducer positioning assembly 136. In accordance with this aspect of the invention, two rectangular, parallel slots 208 are defined by the base plate portion 156 of the card guide means through which the transducers 150 have access to the data stripes 110, 112 on the prepositioned card 102. The card positioning assembly 130 is attached to the transducer positioning assembly 136 by four corner screws 161 shown in FIG. 5.

Figure 9:
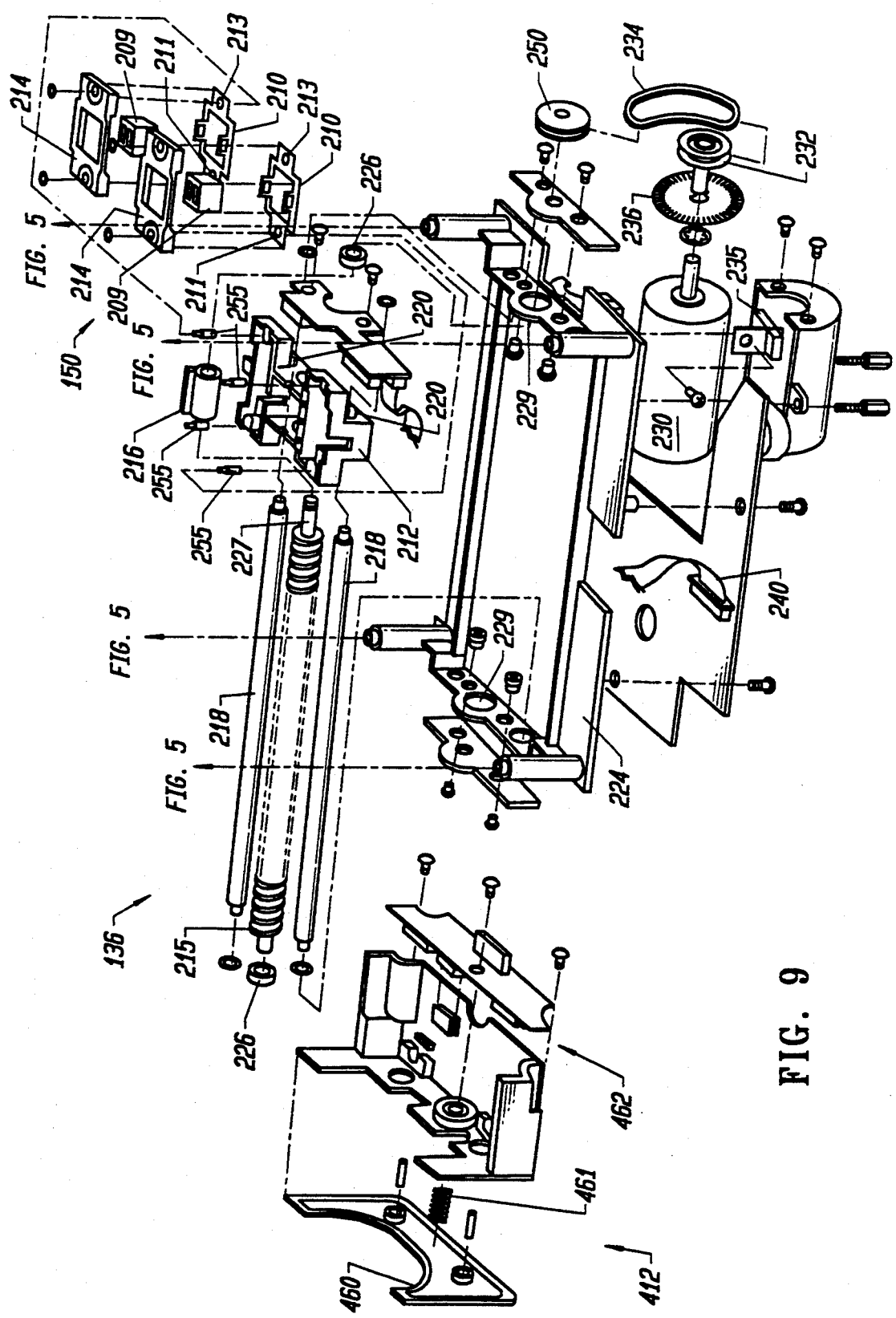
FIG. 9 is an exploded view of a transducer positioning apparatus in accordance with this invention.
Figure 10:
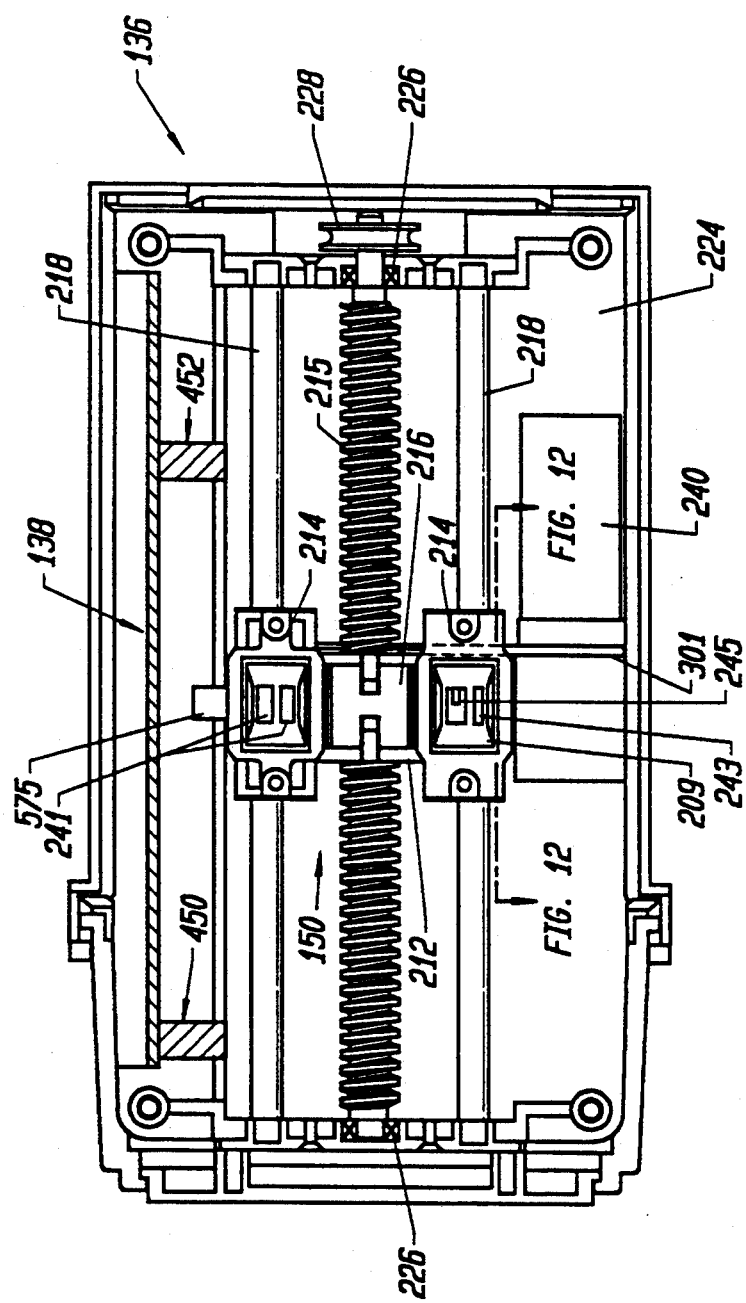
FIG. 10 is a top plan view of a transducer positioning assembly.

As shown in FIGS. 9 and 10, the transducers 150 are, in the preferred embodiment, a pair of industry standard C-size metal cans 209, each housing two magnetic heads. The first stripe 110, storing security information, is accessed by a pair of read-only heads 241. In contrast, the second can contains a read head 243 and a read/write head 245. As is obvious to a person skilled in the art, a number of transducer types are available and useful for reading magnetic tape. For example, head models 8000-0152 (read-only) and 8000-0153 (read/write) from Pierce Magnetics, Inc. located at 951 Lawson St., City of Industry, California 91748 are sufficient for this application. Alternatively, a single transducer can be used in a single stripe card application such as reading credit card information or if more tracks are recorded onto the data stripes, the heads can be designed to access and write data on those tracks by adding more read-only and read/write heads to each can as necessary. In addition to adding the necessary heads, appropriate circuitry must be added to support the additional heads which is within the skill of the art to a person who is familiar with the disclosure herein.

Figure 12:
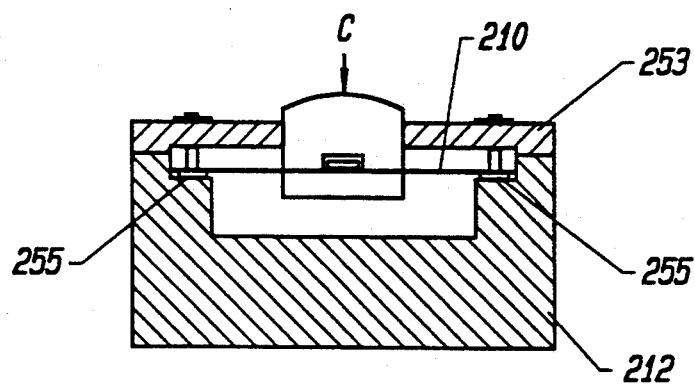
FIG. 12 depicts a sectional view along line 12—12 of the carriage assembly depicted in FIGS. 10 and 11.

Referring to FIG. 12, each metal can encasing the heads 209 is mounted by an adhesive to a leaf spring 210 which biases the can 209 toward the data card 102. A metal plate that forms the leaf spring 210 defines a centrally located opening wherein the metal can 209 is glued. The leaf spring plate 210 is captured between a spring plate cover 253 and a carriage 212. The spring plate 210 is held at each end by posts 255 fixed to the carriage 212. One post 255 passes through a hole 211 at one end of the spring plate 210 and the other post 255 passes through a slot 213 at the other end of the spring plate 210. The slot 213 permits the leaf spring plate 210 to flex as pressure from the data card 102 is applied as shown by arrow C to the heads as they pass along the card's data stripes. In this arrangement, any thickness card 102 can be inserted and the variable thickness card guide path 134 will position the card 102 in the prearranged location. Subsequently, the leaf spring mounted heads 209 will scan the card 102 and maintain constant pressure upon the magnetic stripes along the full length of the card 102 no matter what thickness the card 102.

Figure 11:
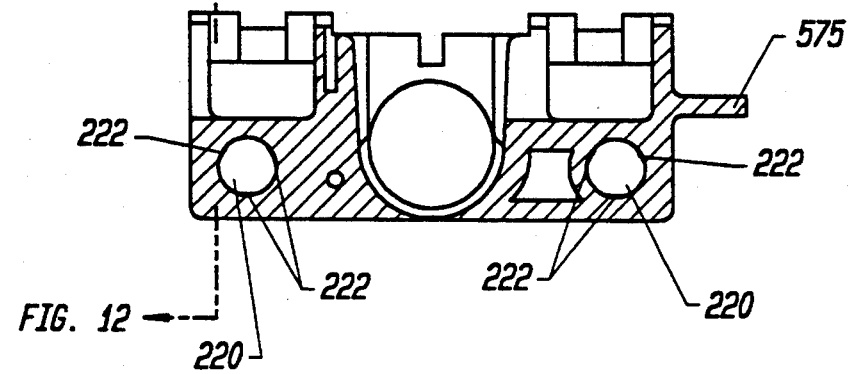
FIG. 11 depicts a carriage having ribbed guide bar holes.

As depicted in FIG. 10, the carriage 212 that carries the transducers 150 is moved in a linear fashion upon a leadscrew 215 having a thread pitch of 3 mm. A threaded member 216 being cylindrical in shape and having threads on the inner surface which match the threads on the leadscrew 215 is fixedly attached in a central position to the carriage 212. The leadscrew 215 is threaded through the threaded member 216 such that when the leadscrew 215 rotates the carriage 212 will move in a linear fashion at a speed proportional to the rotation speed of the leadscrew 215. The carriage 212 is stabilized by a pair of guide bars 218 positioned with one guide bar 218 on each side of the leadscrew 215 in a parallel spaced relation with the leadscrew 215. The leadscrew 215 and the two guide bars 218 lie in the same plane which is parallel to the plane formed by the data card 102 when positioned in the positioning assembly 130. Each guide bar 218 passes through a cylindrical hole 220 in the carriage 212. As depicted in FIG 11, the surface of the cylindrical hole 220 has three protrusions 222 forming ribs spaced equally about the hole 220 and extending the length of the hole 220. The guide bars 218 rest upon at least two of these three protrusions at all times. This ensures that the carriage 212 will not have substantial lateral motion while the transducers 150 are communicating with the data card 102 and reduces the magnitude of the friction between the guide bars 218 and the carriage 212.

As shown in FIG. 10, the guide bars 218 are fixed to a transducer positioning assembly frame 224 at each end. The leadscrew 215 is supported in the frame 224 by bearings 226. An unthreaded portion 227 of the leadscrew extends beyond the bearing support 229. Upon that end is fixedly attached a pulley 228. The drive means for rotating the leadscrew 215 is a rotary motor 230 in combination with a pulley 232 and a rubber belt 234 made of special NBR by Yuan Cherng Industry Co. Ltd., No. 529 Chang Lu Road, Sec. 7 Fushin-Hsiang, Chang Hua, Taiwan, Republic of China 50609. To generate repeatable leadscrew rotation speed, a tachometer is provided. The tachometer (TACHO PCB), shown in FIG. 9, consists of electro-optic circuitry 235 for measuring the rotation speed of a slotted disk 236 having 100 slots which rotates in cooperation with the motor 230. The monitoring electro-optic sensor 235 measures the rotation speed of the disk 236 by sensing the number of slots that pass before the sensor 235 during the write sequence and ensures an accurate data transfer rate. In so doing, the micro-controller which controls the entire system synchronizes the data writing speed with the motor speed indicated by the sensor 235.

Figure 13:
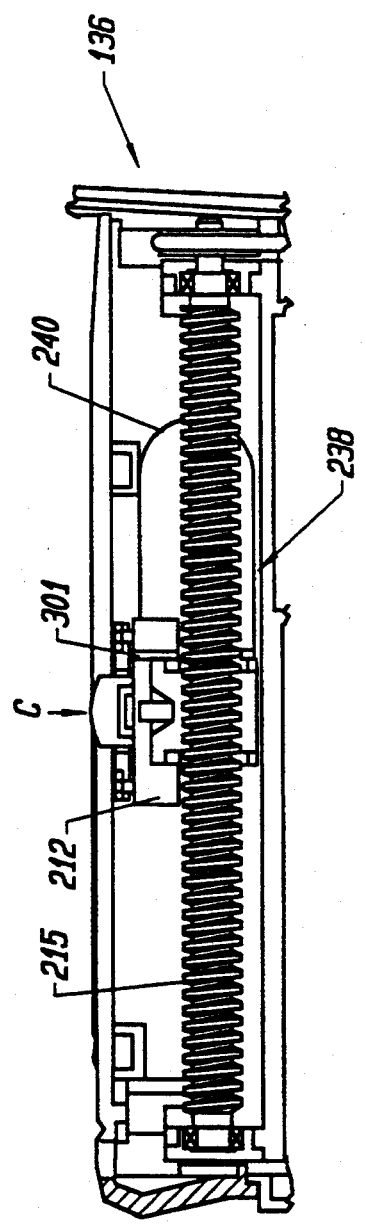
FIG. 13 is a side, cut-away view of a transducer positioning assembly depicted in FIG. 10.

As depicted in FIG. 13, the transducer 150 signal wires are connected to a small circuit board 301 (MAGNETIC HEADS PCB) on the carriage. From this intermediary circuit board 301 the signals are sent via a flexible printed circuit cable (PCC) 240 to an amplifier and signal conditioning circuit 238 mounted beneath the transducer positioning assembly 136. The intermediary circuit board 301 transfers the signals from a plurality of independent wires attached to the transducers 150 into an arrangement that interfaces with the PCC 240.

Figure 14:
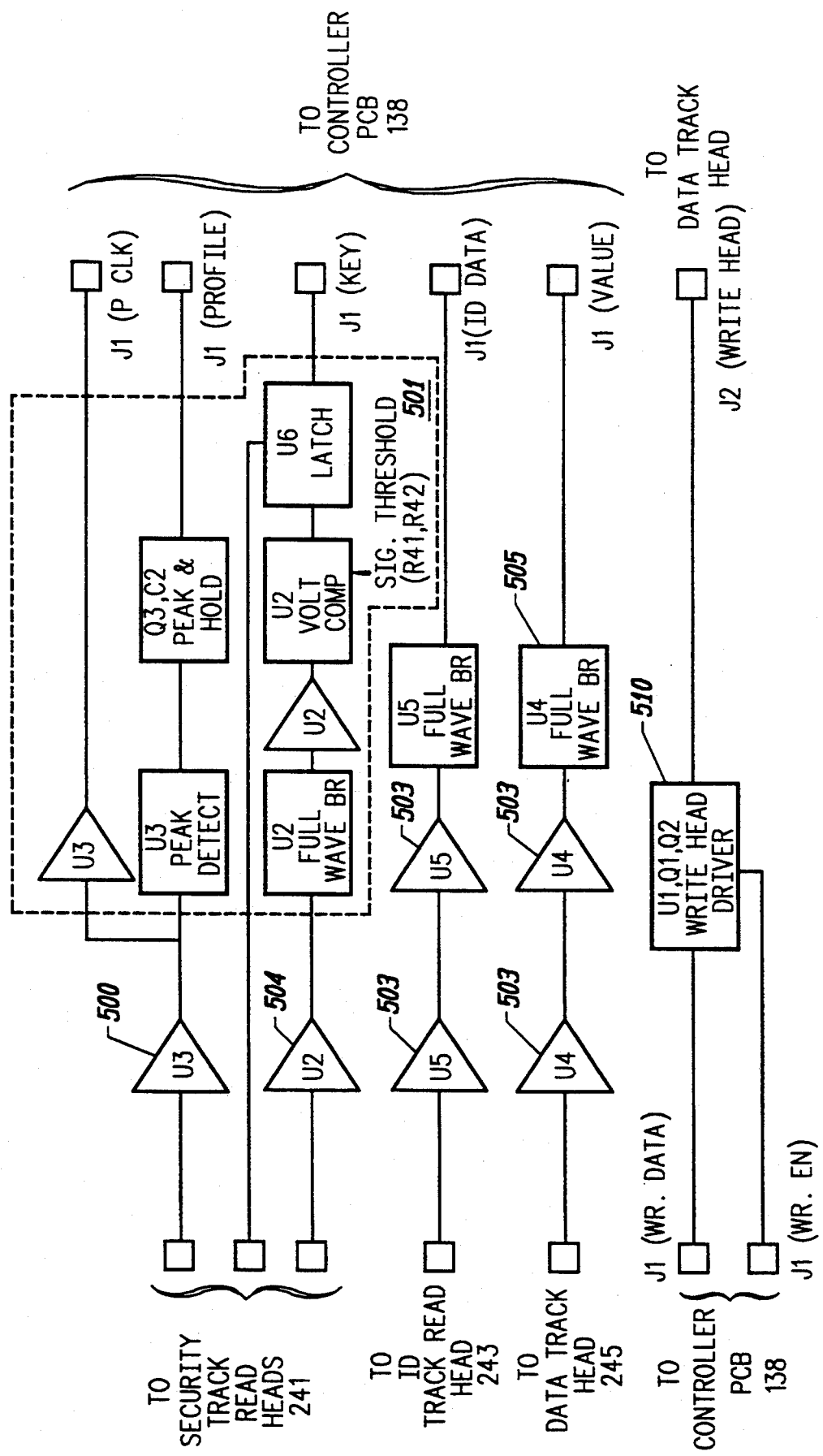
FIG. 14 is a block diagram of a head signal amplifier and conditioner circuit board.
Figure 15:
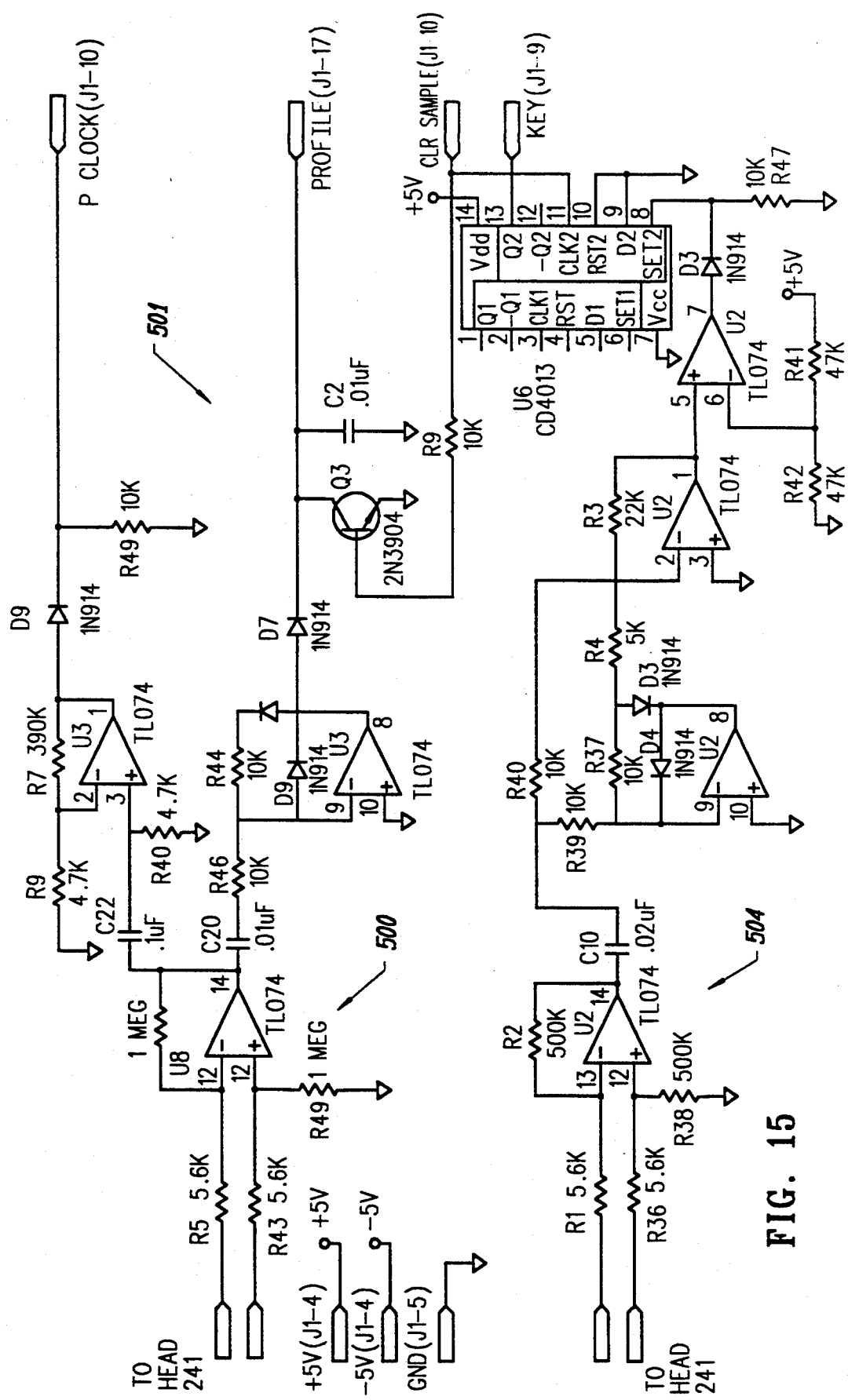
FIG. 15 is a schematic diagram of exemplary circuitry used to read the security stripe data.

Referring to FIG. 14 a block diagram of the amplifier and signal conditioning circuitry 238 (HEAD AMP PCB) used in one embodiment of the present invention. The signals from the read-only head 241 associated with security track 114 is amplified by a factor of approximately two hundred by amplifier 500. The security signal from track 116 is amplified by a factor of approximately one hundred by amplifier 504. The amplified signals are conditioned by the circuitry depicted in block 501 as required by the Rand McNally technique to decode the KEY, PROFILE and CLOCK signals that constitute the security information. A schematic for the circuitry required to amplify 500, 504 and condition 501 the security signals properly is shown in FIG. 15.

Figure 16:
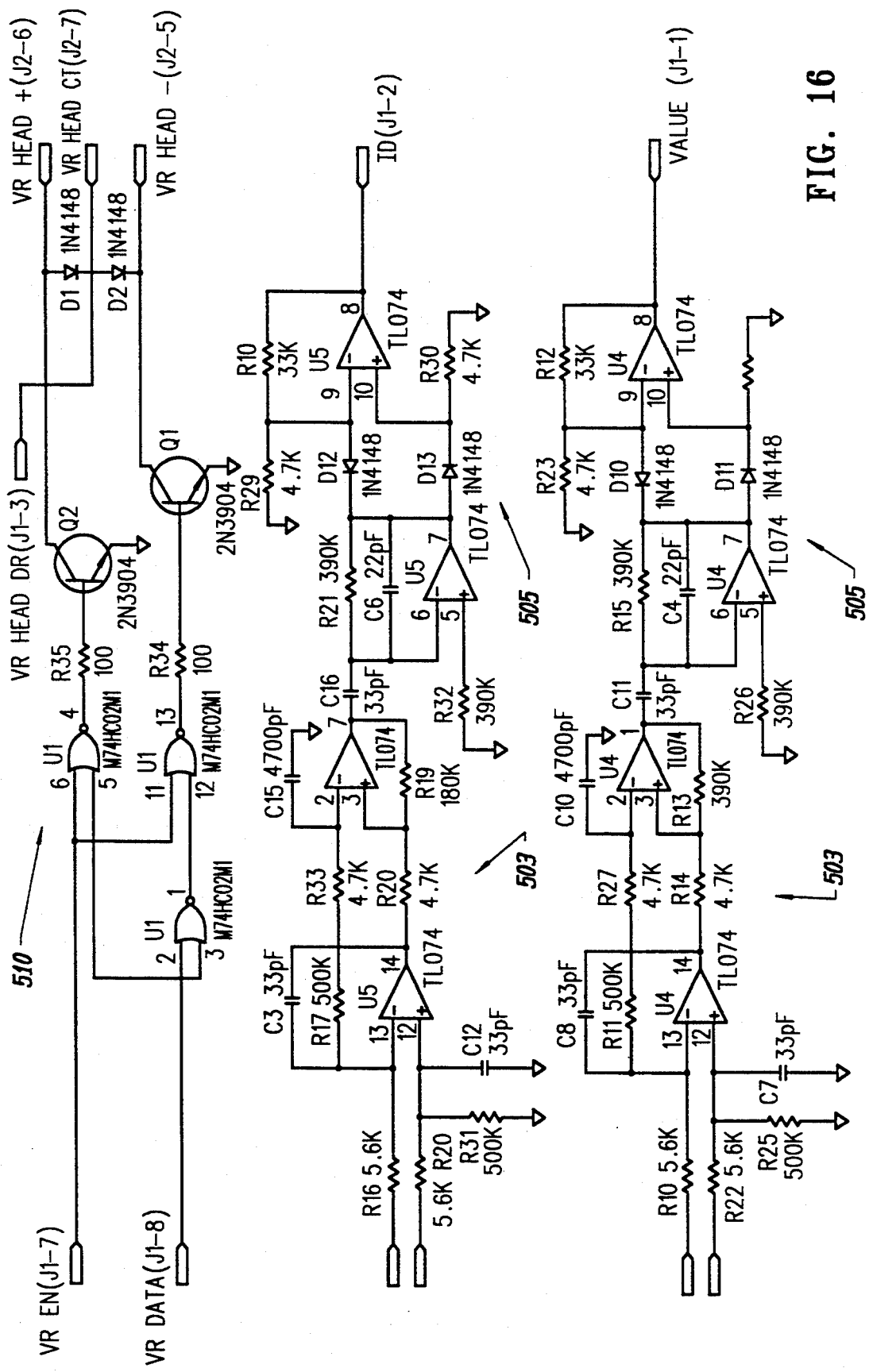
FIG. 16 is a schematic diagram of exemplary circuitry used to read the data and ID track information and is a schematic diagram of exemplary write head driver circuitry.

As depicted in FIG. 14, the analog signals from the read-only head and the read/write head are amplified 503 and conditioned 505 similarly. Two stages of amplification 503 increase the signal strength by a factor of approximately one hundred and a full wave bridge 505 conditions the signals for processing by the microcontroller circuitry (not shown). A schematic diagram depicting one possible embodiment of the circuitry necessary to implement the amplification and rectification stages of FIG. 14 are shown in FIG. 16. Note that a single IC operational amplifier, TL074, having four amplifiers is used for the active components of all the stages of amplification and rectification. The output of the circuitry is a pulse signal representing the flux transitions recorded upon each track of the data stripe.

In addition to amplification and signal conditioning circuitry 238, the circuit board 238 of FIG. 14 contains a driver circuit 510 for the write head which is capable of generating approximately 4000 Oersteds of magnetic field strength. This large field strength provides exceptional security against inadvertent erasure and intentionally deceptive overwriting of the data stored on a card. The circuitry used to fulfill the requirements above is depicted in schematic form in FIG. 16. The digital WRITE ENABLE signal and the digital DATA are sent from the microcontroller circuitry (not shown). The digital DATA signal is converted to an analog signal via transistors Q1 and Q2 appropriate for driving the write head and producing flux transitions on the data stripe in accordance with the digital signal.

In accordance with one aspect of the invention and depicted in FIGS. 4 and 5, a shutter assembly 300 is provided to enhance system security. The shutter assembly for selectably covering the card guide path 134 consists of a shutter 302 which covers the guide path and two arms 304, 306, each extending in a parallel fashion from each end of the shutter 302. The arms 304, 306 pivot upon the slave pulley shaft 181 which extends through the card positioner frame 158 at both ends. Fixed to the shaft 181, but external to the frame 158 is a plastic sleeve 310 forming a holder for a disk 312 made of a ferrous material such as steel. Correspondingly, attached in a fixed manner to one shutter arm 306 is a small magnet 314 near which the slave pulley shaft rotatably passes. In operation, the magnetic flux of the magnet 314 couples to the ferrous disk 312 such that when the disk 312 rotates, i.e., the slave pulley 180 rotates, the shutter assembly is caused to pivot and open or close the shutter 302 covering the entrance to the card guide path 134 depending upon the direction of rotation of the slave pulley 180. In this embodiment, when the card positioner assembly 136 operates to draw a card 102 into the system, the shutter 302 closes. An opto-electric sensor 320 detects when the shutter 302 is in the closed position and enables the controller circuitry to begin the card scanning process. If the shutter 302 is pried open during the scanning process, the sensor 320 will instruct the electronics of the occurrence, the scan process will be stopped and the card ejected. The magnetic coupling mechanism opens the shutter 302 when the drive belt is rotated in the expel direction.

Vibration and gravity may cause the shutter 302 to fall to the closed position over time. To ensure that the shutter remains open without periodic counter rotation of the drive belt 176, a counter weight screw 322 and nut 324 are provided to maintain the shutter 320 in the open position. The counter weight force is easily overcome by the rotational coupling force when the drive belt 176 is rotated causing the shutter 302 to close.

Figure 17A:
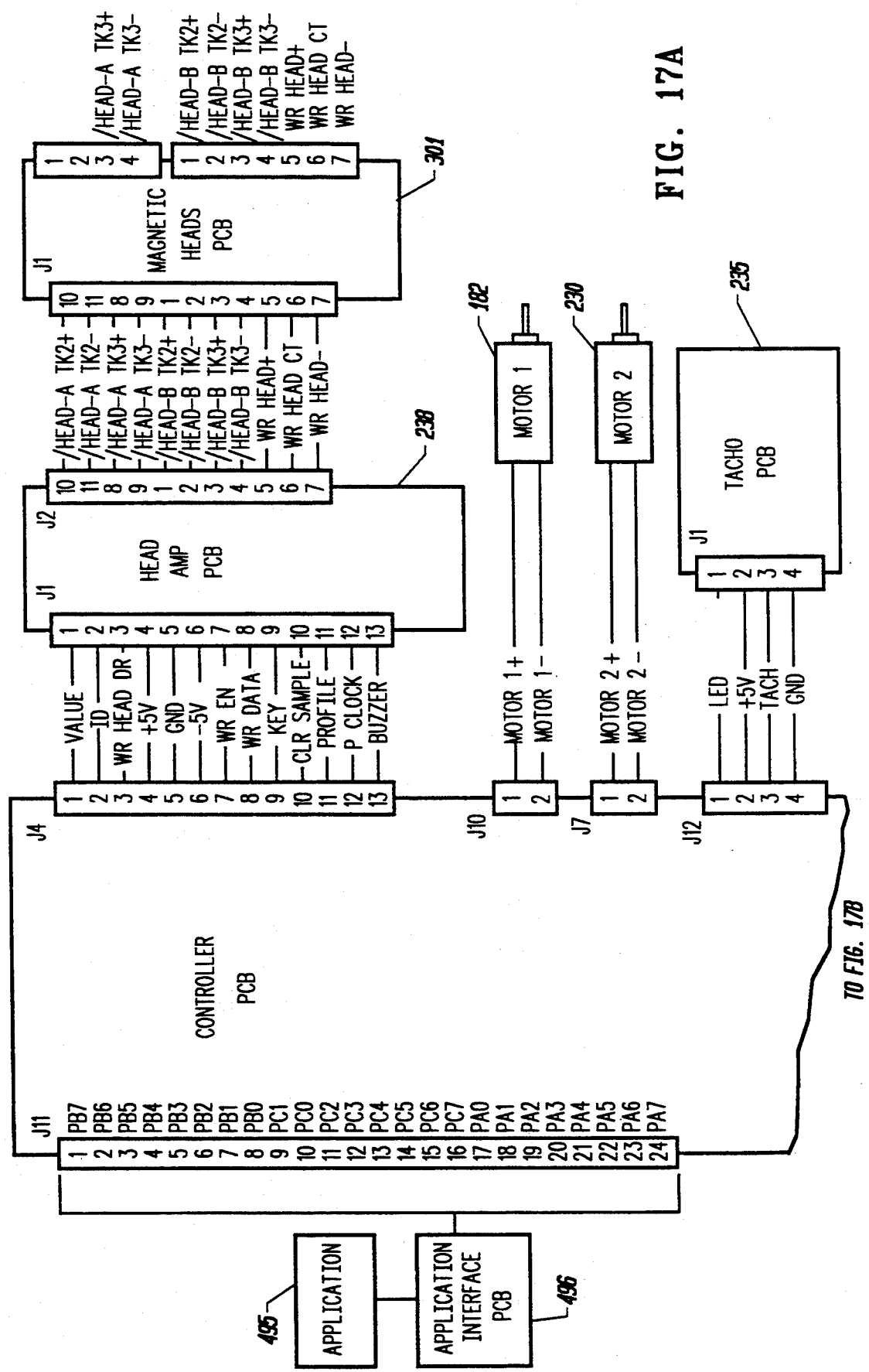
FIGS. 17A-B block diagram depicting the interconnections of all of the electrical circuits associated with this invention.
Figure 17B:
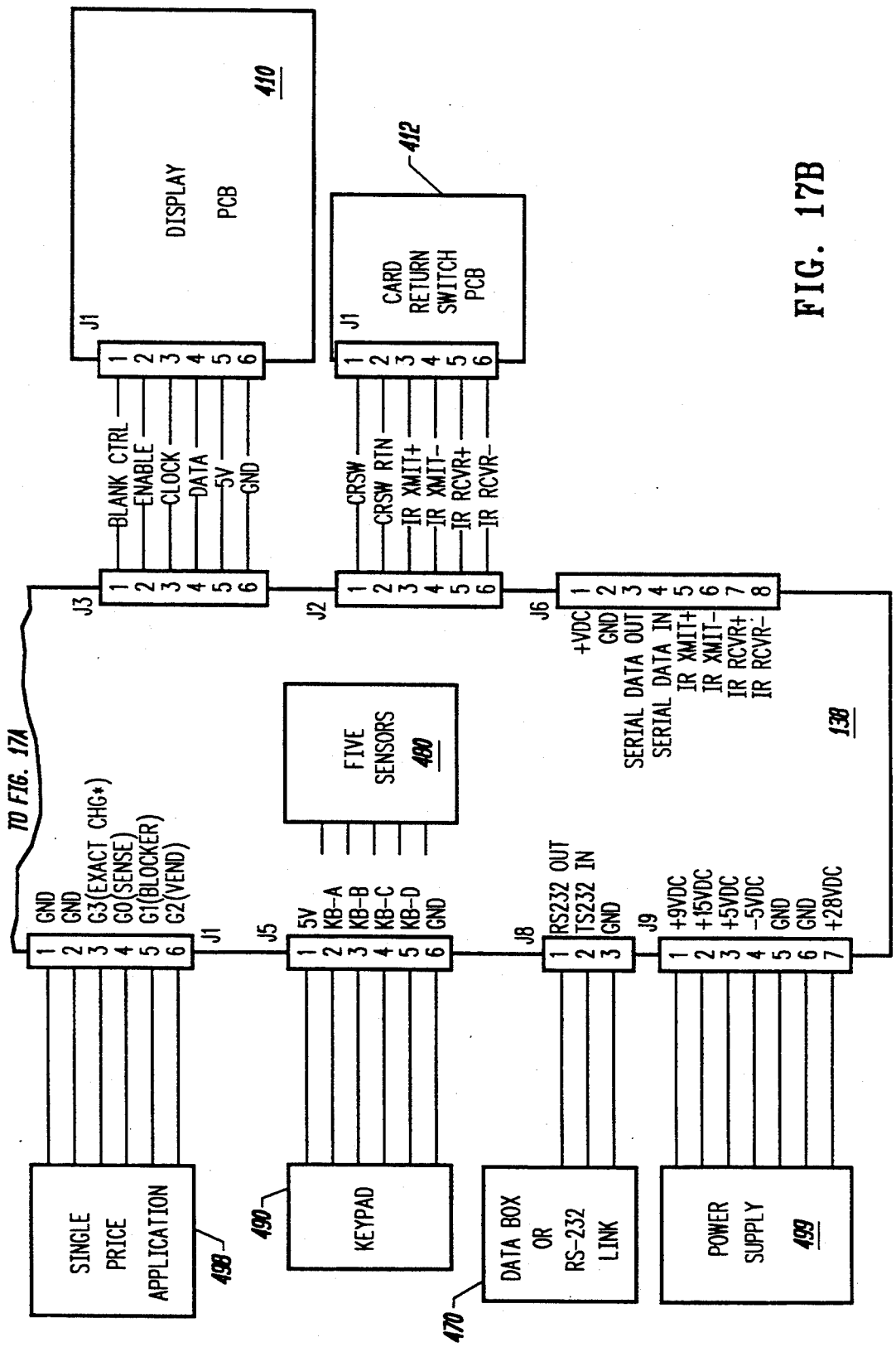

Referring to FIG. 17, the main circuit board 138 having a micro-controller that communicates with a variety of circuits which supply signals to the processor and utilize signals from it. Each of the external circuit boards and apparatus is discussed below in connection with the micro-controller integrated circuit.

Figure 18:
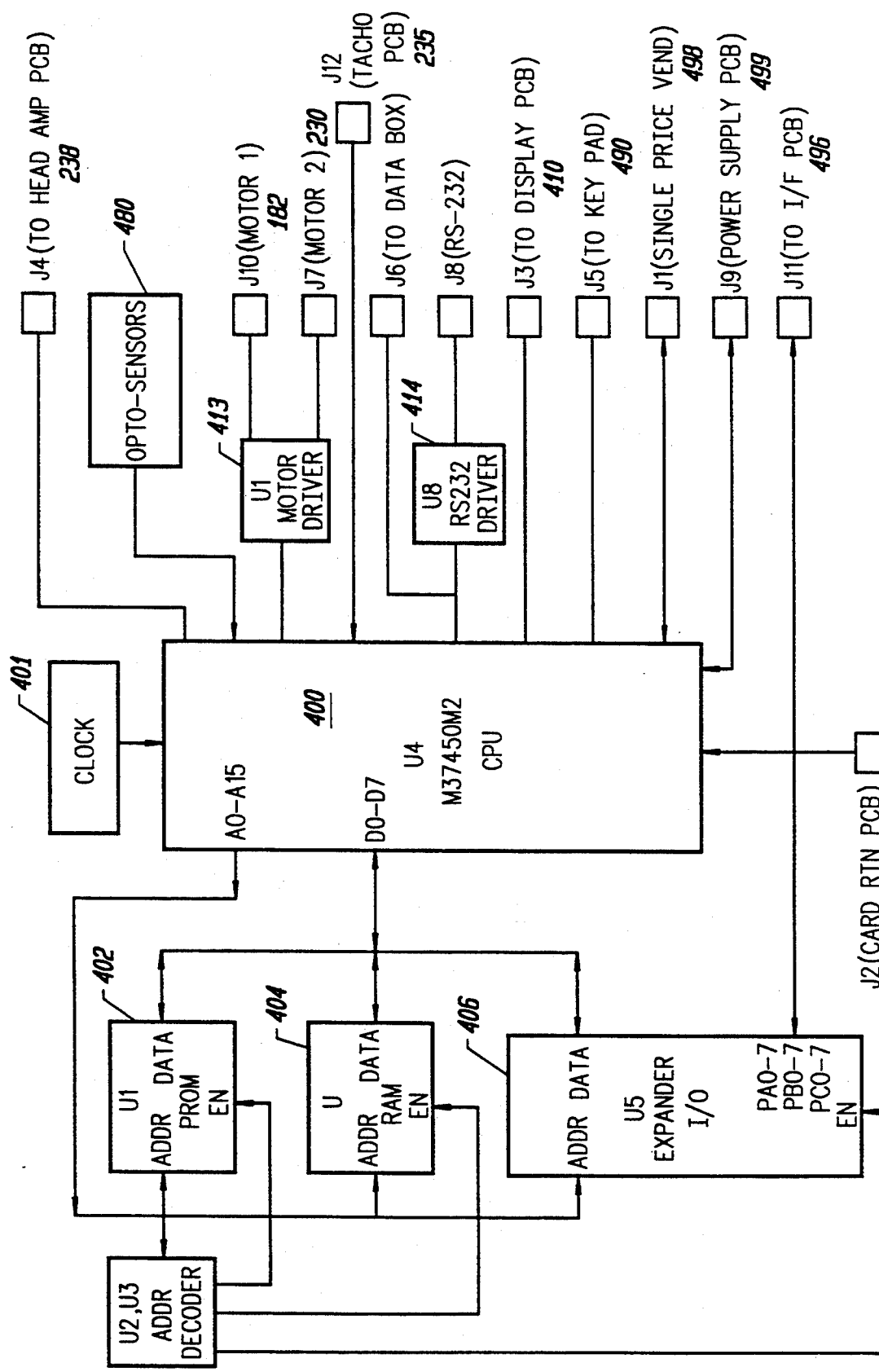
FIG. 18 is a block diagram of a microcontroller based control system for use in controlling the operation of this invention.

The linear data card scanner 100 of the invention is controlled by a single micro-controller integrated circuit such as an M37450M2 manufactured by Mitsubishi, Inc. FIG. 18 depicts the microcontroller unit (MCU) 400 in conjunction with its support circuitry. The microcontroller 400 has an 8-bit bidirectional data bus, a 16-address bus, and 32 I/O ports. A 10 MHz external crystal 401 controls the processor's speed. The firmware that controls the system 100 via the microcontroller 400 is stored in the external EPROM 402. To execute all of the functions that are described below, at least 256K of EPROM storage is required. Optionally, 8K or more of RAM 404 can be used along with an I/O port expander 406, e.g., an 8255 integrated circuit, to provide 24 extra I/O ports.

At least thirty-three ports are used to communicate with the various circuit boards depicted in FIG. 17. Each of the port allocations and the circuit boards connected to them are discussed below in reference to FIGS. 17 and 18.

Eight ports are connected to the amplifier and signal conditioner circuit printed circuit board (PCB) 238. The MCU 400 processes the pulse signal data card information resulting from the bridge circuit 505 used to condition the analog signal recovered from the data stripe. The MCU 400 interprets the security information stored on stripe 110 and the data card ID and data information written on stripe 112. The data track and ID information track data are generally written in a scrambled format. The MCU 400 handles the decoding task and extracts the necessary information from the decoded bits.

Figure 19:
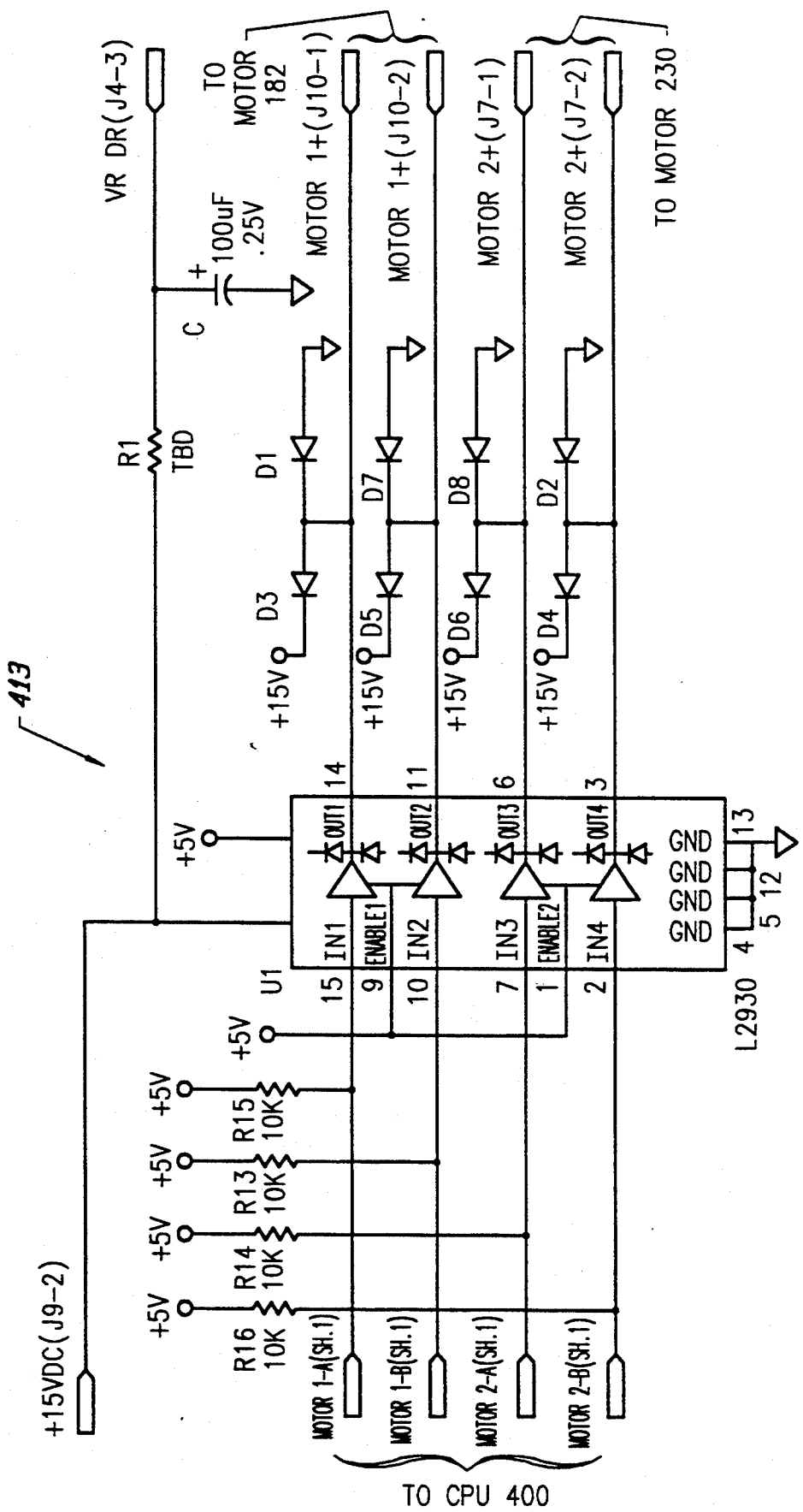
FIG. 19 is an exemplary schematic diagram of motor driver circuitry.

Four ports are connected to a single chip motor driver 413 which controls the speed, direction, and braking force of the two motors 182, 230 in response to pulse width modulated signals from the micro-controller 400. The driver IC, L293D, and its support circuitry are depicted in FIG. 19.

One port is connected to the tachometer sensor on the TACHO PCB 235, whose pulsed signal is used by the MCU 400 to synchronize the write data with the transducer speed.

Figure 20:
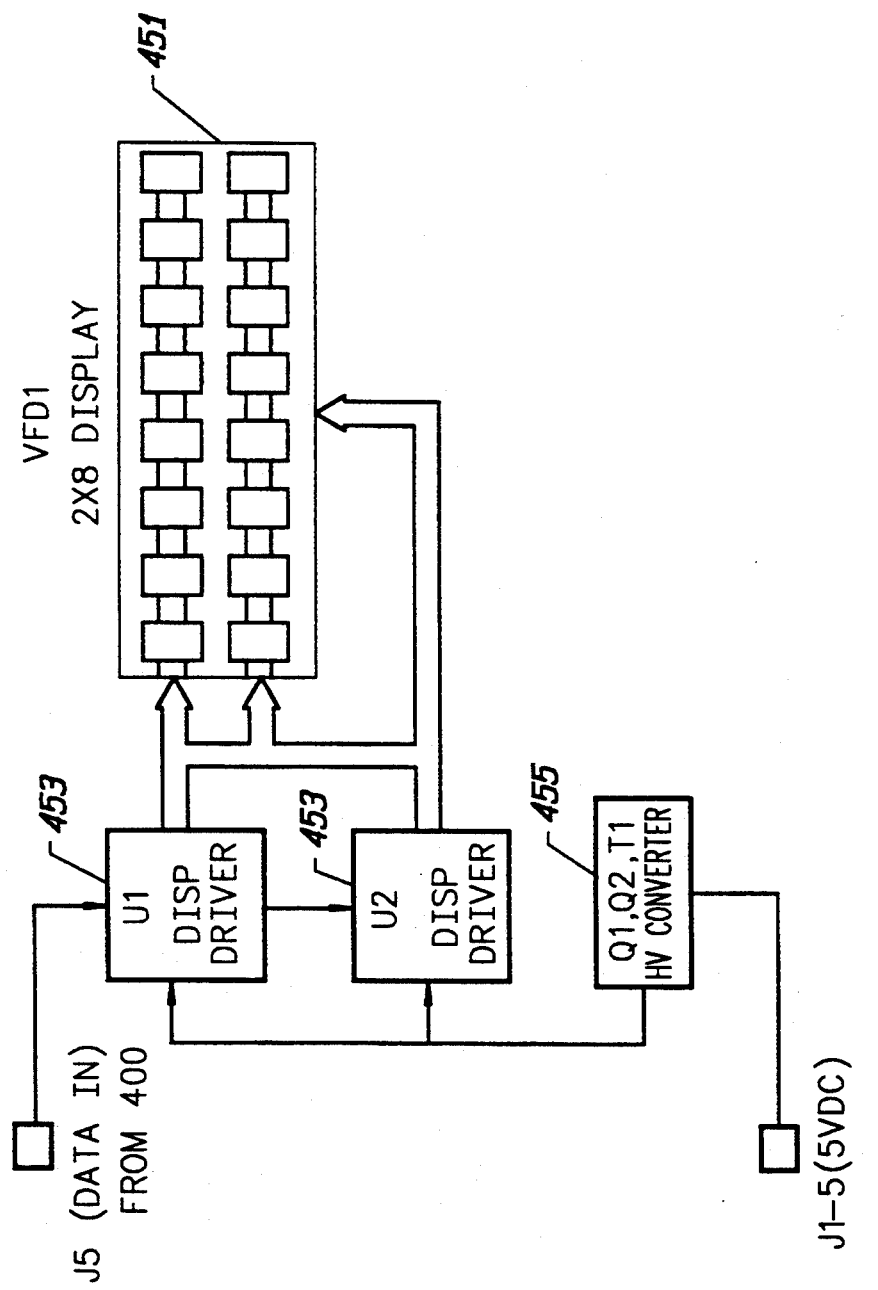
FIG. 20 is an exemplary block diagram of display circuitry.

Four ports are used to send control information to the display driver circuitry 410. A block diagram of one embodiment is depicted in FIG. 20 having a two by eight character vacuum fluorescent display (Futaba 82-SY-51Z) 451 driven by two twenty bit display driver chips (National Semiconductor MM58242V) 453 and a high voltage converter circuit 455 are sufficient to display system requests and information in a vending machine application. Expanded display capabilities may be necessary for more complex applications.

One port is connected to the front panel card return switch 412 to inform the MCU 400 when the user desires the scanning process to be interrupted and the card 102 to be returned. As depicted in FIG. 3, the switch plate 460 is spring loaded 461 to bias it against the front panel 124. A simple pair of contact switches 462 are engaged when a user depresses the switch plate 460 and the micro-controller 400 interrupts the processing to return the card 102 to the user.

Two ports are connected to an RS-232 driver 414 or a data box 470. The RS-232 provides a means by which data from the card and any transaction data such as amount and time that the transaction occurred can be sent to other devices. A data box 470 is used when the transaction information is to be saved locally. The data box 470 is any one of a variety of memory systems that store information and then enable the system owner to access it after an accumulation period. Access is generally via a hard wire connection, but may be accomplished by a remote infra-red data accessing link.

Figure 21:
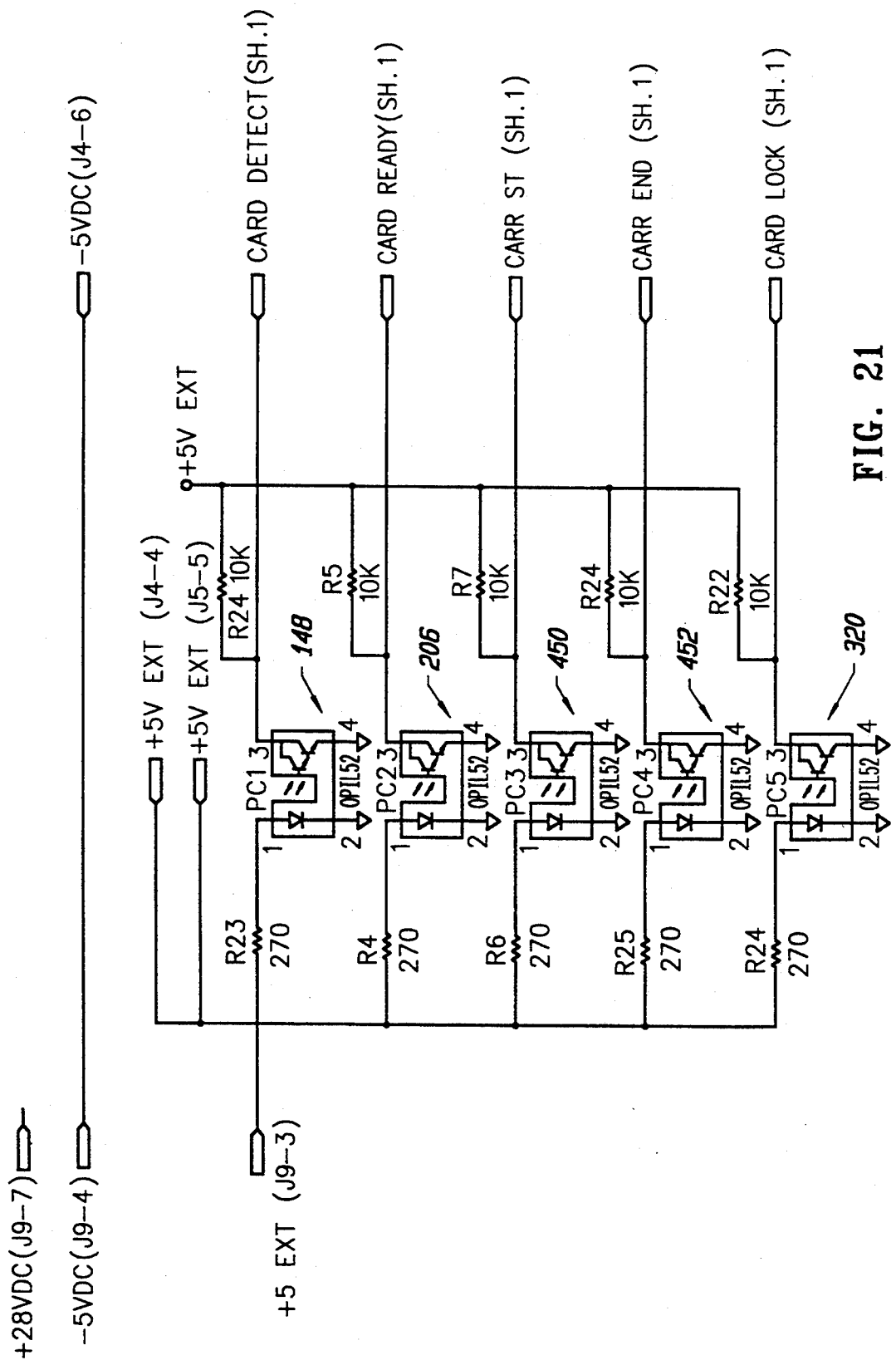
FIG. 21 is an exemplary schematic diagram of photoelectric sensor circuitry.

Five ports are connected to five different electrooptic sensors located on the main PC board 138 shown as block 480 on FIG. 17. The sensors are depicted in schematic form FIG. 21. The five sensors monitor the location of the data card 148, 206, the location of the transducer carriage 450, 452, and the shutter 320. Sensor 148 detects when a user inserts a data card and it initiates the card positioner assembly operation. Sensor 206 detects when the card reaches a prearranged position within the data card guide path 134. The drive belt 176 is then stopped. Sensors 450 and 452 detect the position of the carriage 212 at either end of its travel length. Carriage 212 has a flag 575 which intersects the light path in opto-electric sensors 450 and 452 positioned at each end of the carriage's travel length. If the carriage 212 is not detected it is moved until it is at one end or the other of the transducer positioner assembly 136, i.e., sensed by either sensor 450 or 452. Sensors 450 and 452 also determine when the transducers 150 have made a full pass over the data card 102. Sensor 320 detects when the shutter 302 is pried open during data card processing. The use of these signals is explained further in describing the card scanning process below.

Four ports are assigned to the keypad connector which enables the system owner to conduct diagnostics or configure system parameters. The diagnostic function enables a self test to be conducted via a disconnectable keypad 490, also referred to as a Handheld Initialization Terminal (HIT). The self-test executes such functions as memory diagnostics, display test, keypad test, motor test, transducer positioner assembly test, and cable connectivity tests. These tests are for both field service diagnostics and manufacturing testing and diagnostics.

Via the keypad 490, various system parameters may be programmed, such as a site ID for accounting purposes, enable the card swallow function, select an interface type from a menu to correspond to a specific application, set a price table, set a clock, enable the security reading circuitry, setting the writing density, adjusting timing and other parameters to conform to a particular application, among other functions.

Four ports or more are connected to the application 495 via an application specific interface 496. These ports are usually associated with the expander chip 406 because many application require a great many communication lines. For instances, a Micro-Mech application that allows a consumer to select one of a number of goods from a vending machine where a variety of prices exist. This application can require up to 24 I/O ports. Other applications such as single-price vending machine, credit card validation, building access card readers may require less ports and thus won't need an expander chip. For instance, a single-price vending machine 498 requires only two ports be controlled by the MCU, a vend line and a block line. Thus, the application interface is connected directly to the MCU 400 and the expander chip 406 is not used.

The circuitry 138 is powered by a DC power supply 499 located in a separate housing from the linear scanner apparatus. Typically, the power supply converts 120 volt AC into 28, 15, 9, 5, and −5 volts DC. However, other power supply voltages may be necessary when the system is applied in countries other than the United States.

The following description focuses upon use of the data card scanner apparatus in conjunction with single-price vending machine and a Micro-Mech vending machine. However, it is obvious to a person skilled in the art that the inventive scanner can be used in any application where information is necessarily communicated to/from data cards such as building access, credit card validation, multi-price vending machines, cafeteria payment systems, etc.

Figure 22:
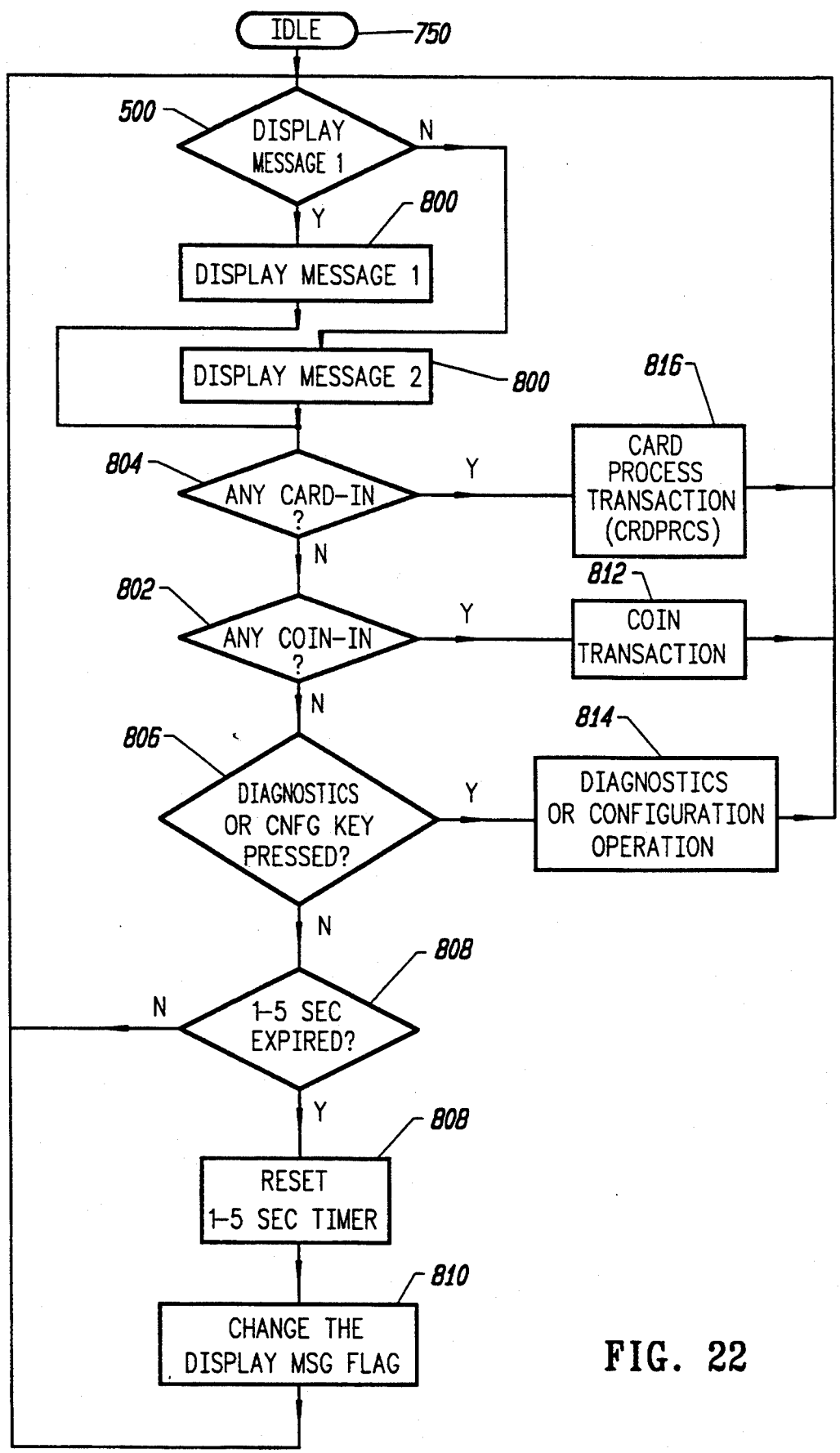
FIGS. 22-24 are block diagrams depicting the operational steps accomplished by the preferred embodiment of the invention.

In operation, the system 100 remains in an IDLE mode 750 awaiting either data card entry, coin insertion, or a keypad command. FIG. 22 depicts a flow chart of the operation of the invention. From the IDLE routine various subroutines are called to execute necessary system functions. Initially, a message is displayed upon the system display such as "INSERT CARD" 800. The controller checks if either a coin has been inserted 802, a card has been inserted 804, i.e., sensor 1 is triggered, or a special initialization key combination on the keypad has been depressed 806. These initializing states are monitored for 1.5 seconds 808, thereafter the idle message is changed 810 and repeated.

If a coin is inserted 802, the keypad and card processes are locked out and a traditional coin operated vend process will be initiated 812. After the coin transaction is completed, the controller returns to the idle routine 750.

If a proper key combination is depressed 806, the system enters the diagnostic/configure state 814. As described above, the user or field technicians can perform system diagnostics to aid in making repairs. The configuration mode enables the system to be tailored to the specific application. For instance, the system would usually be tailored to function with a micro-mech interface or a single-price vending machine. However, for this example the flow chart shows both routines below.

Figure 23A:
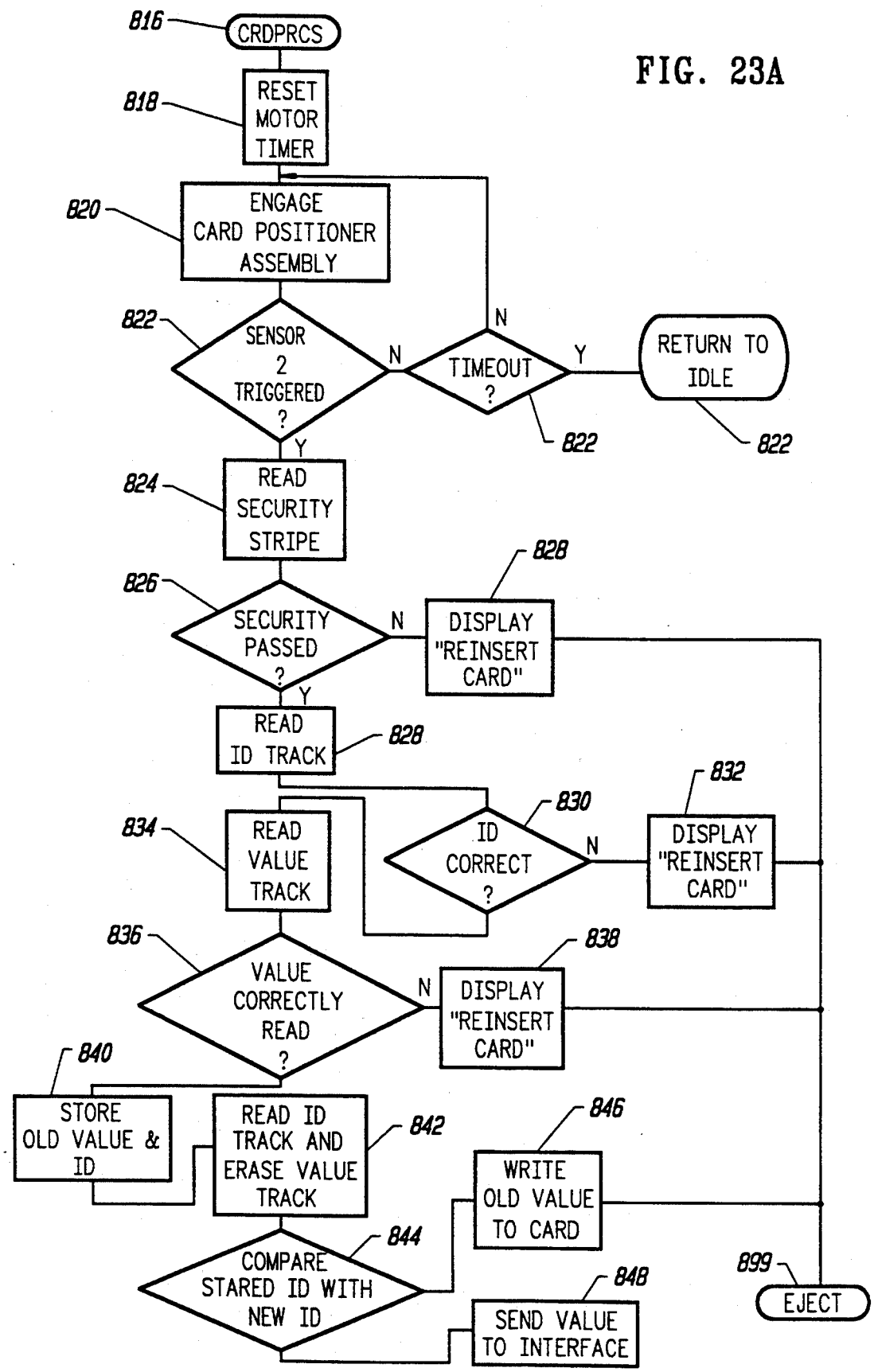
Figure 23B:
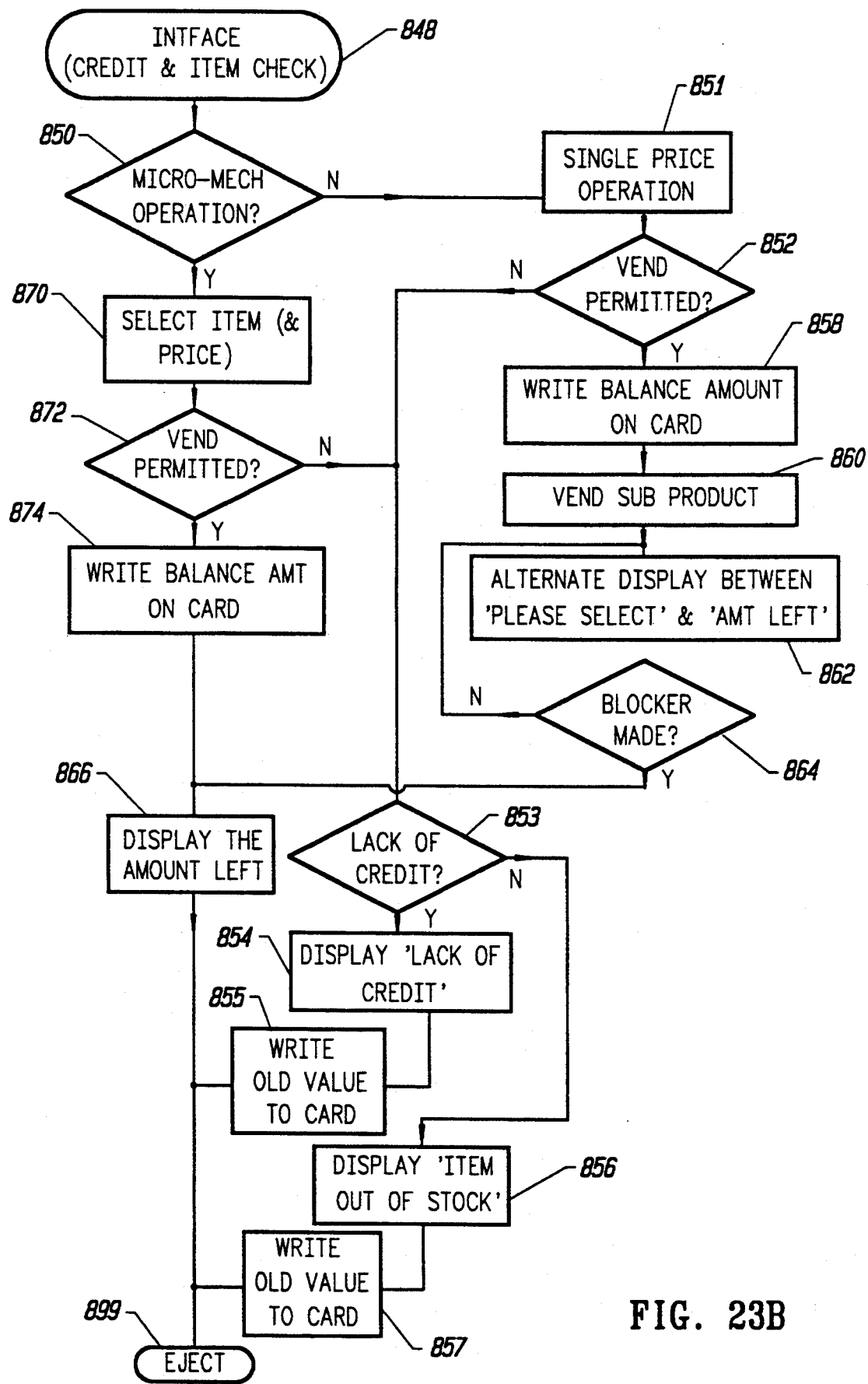
Figure 24:
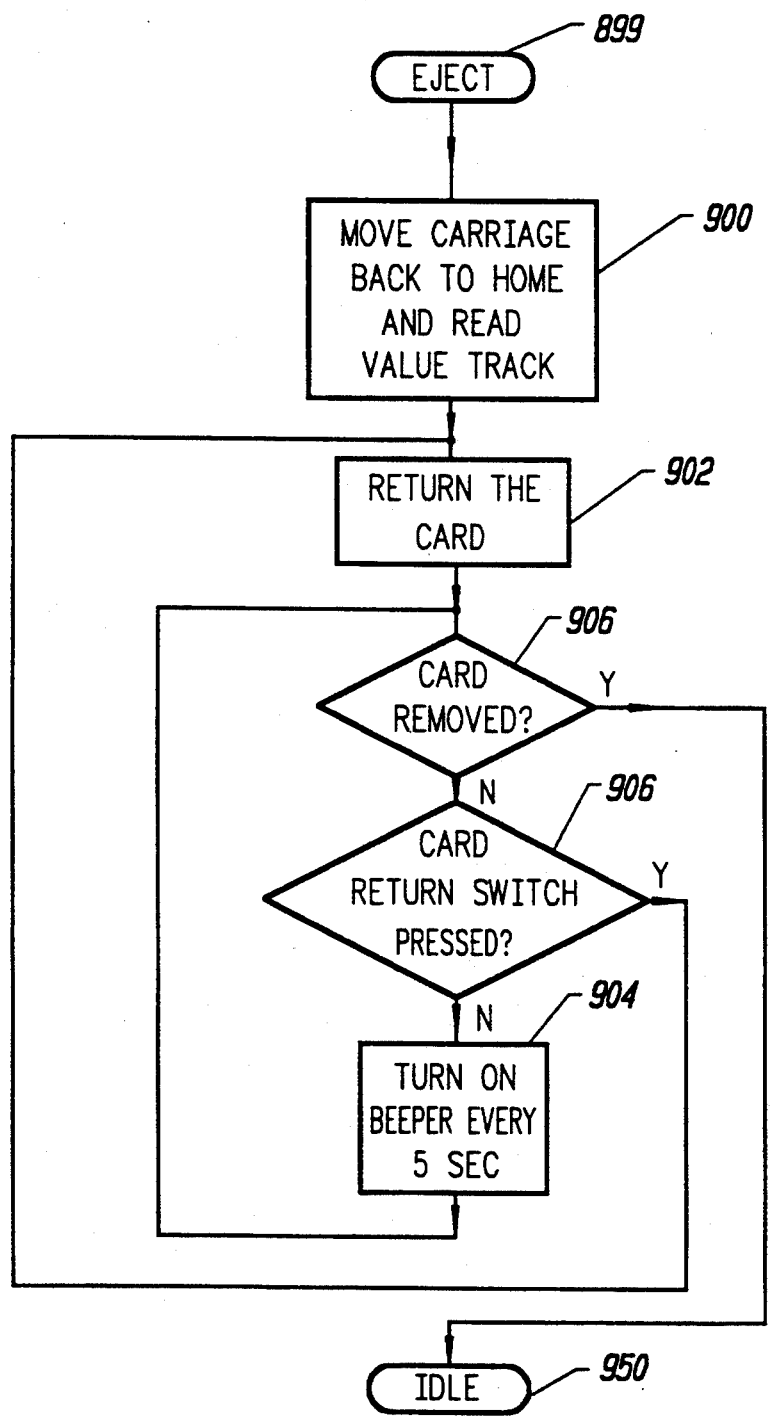

If a card is inserted 804, the system enters the CRDPRCS routine 816 and the card positioner motor timer is reset 818. The CRDPRCS routine 816 is depicted in FIG. 23. If the second sensor in the card positioner assembly is not triggered within 2 seconds after the card positioner motor is engaged 820, the system resets itself to the IDLE routine 822 and awaits another initialization command. The timer loop 822 comes into play when a user inserts a card and then removes it prior to the card positioner pulling it into the assembly. After the card is situated within the card guide path and the shutter has been closed, data stripe 110, the security stripe, is read by the transducers as they are moved from HOME position near one end of the assembly to the FAR HOME position at the other end of the assembly 824. The carriage sensors, sensors 134 and 206, determine when the carriage is positioned at HOME and FAR HOME. If the security information is not deemed proper at 826, the display is caused to display "REINSERT CARD" 828 and the card is ejected by reversing the card positioner assembly motor. If the security system algorithm approves the card at 826, the transducers are moved from FAR HOME towards HOME and read the information on the second data stripe 112, step 828.

It should be noted that the data on the card may be read in either direction. The raw data is stored in a buffer as it is read. Subsequent processing decodes the raw data and generates the information. Preferably the American Bankers Association's data format is used for recording all of the data to the data stripes in a two-frequency, coherent phase format. The ABA format is as follows:

TABLE I

| | <SS> [DATA] <ES> <LRC> | | |
| TYPE | FIELD | LENGTH | DESCRIPTION |
| --- | --- | --- | --- |
| <SS> | Start Sentinel | 1 character | Value = 0B |
| [DATA] | Information | *** | Numerical |
| <ES> | End Sentinel | 1 character | Value = 1F |
| <LRC> | Block code check | 1 character | Longitudinal redundancy code |

*** - the number of data characters is application determinative

Besides the above format, the data stripes contain a series of ZEROs before and after the above data structure to permit the system to determine the duration of each ZERO bit. This is important because a ONE bit has the characteristic of flux transitioning in the middle of a ZERO bit period. As the bits are read, the average duration of the ZERO bit is calculated and updated. A signal transition within a ZERO bit duration indicates a ONE bit. Since the ZERO bit duration is important for ONE bit detection, it must be accurately determined. The averaging function is performed to compensate for any fluctuation in the running speed of the transducer positioning assembly that would impact the duration of the detected bits.

Subsequent processing utilizes the End Sentinel and Start Sentinel characters to determine the direction in which the data was read. From this information, the information data is decoded and the longitudinal redundancy code is checked for validity. Further decoding may be necessary if the data bits have been scrambled for extra security. In addition to bit scrambling, bit swapping and encryption methods are optionally used to improve security. If these methods are used then the controller must be programmed to deswap and decrypt the data.

The card identification track is read on the first pass of the transducers over stripe 112 and the ID information is checked to ensure that the data was correctly read 830. If not, the "REINSERT CARD" message is displayed 832 and the card is ejected. The heads are moved in the opposite direction to read the value track 834. If the value information was not read properly 836, a message is displayed 838 and the card is ejected. If the value information is proper, the value and card ID information are stored in memory as OLD.VALUE and ID at step 840. If the card is deemed to have a proper ID for the machine in which it was inserted and the value data was read properly, the card is accepted.

The transducers are moved toward HOME from FAR HOME while the ID track data is reread and the value track is erased 842. The ID read at this pass is compared to that which is stored in memory to ensure that a card switch has not occurred during the validation processing 844. If the ID's are not identical, the card is ejected without a value.

If the ID's match, the card value stored in memory is displayed to the consumer and also sent to the interface assembly 848. The interface system utilizes the value of the card in an appropriate manner to facilitate a vending machine purchase. The manner in which the value is utilized depends upon the specific application.

The flow chart of FIG. 23 depicts both a micro-mech vend and a single-price vend.

During the CONFIGURATION routine the owner would have set a flag stating that the scanner was to be used in conjunction with one or the other machine. First, the single-price vend will be discussed.

The query at step 850 is answered negatively in a single-price vend application 851. The controller determines if a vend is permitted by checking if OLD.-VALUE is sufficient to purchase the goods and if goods are available 852. If the answer is NO and the OLD.-VALUE is not sufficient to purchase an item 853, the "LACK OF CREDIT" message is displayed 854 and the controller starts the card ejection routine after writing the OLD.VALUE back on the card 855.

If there is sufficient credit, but still a vend has not permitted, the system defaults to an "ITEM OUT OF STOCK" message 856 and enters the card ejection routine after writing the OLD.VALUE back onto the card 857.

However, if a vend is possible as determined at step 852, the scanner apparatus writes the balance remaining onto the value track 858 and the product is dispensed by command of the controller via the interface 860. The new card value is written to the data stripe in the form shown in TABLE I. In addition, a number of characters representing ZEROs are written in front and behind the data structure. Preferably, between 8 and 16 ZERO bits are written as lending bits, the number is dependent upon the card's position within the positioning assembly, and 8 ZERO bits are written as trailing bits. The data is written as the transducers travel from the HOME to the FAR HOME position. The speed of the transducers directly effects the amount of data that can be written to the data stripe. Therefore, the tachometer signal is used to accurately control the write rate throughout the write process. The amount of data written to any card may vary from application to application. This aspect is controlled by variables in the firmware which are set via the CONFIGURATION routine. During this process the display scrolls the "PLEASE SELECT" and the "AMOUNT LEFT" messages 862 alternatively until the product is dispensed and the blocker signal returns from the interface indicating that a product was dispensed 864. This instructs the controller that the process is complete. The "AMOUNT LEFT" message is displayed one last time 866 and the system enters the card ejection routine.

If the micro-mech interface is used, the query at step 850 is answered affirmatively and the interface must report the price of the item selected to the controller to enable it to determine if enough credit is available on the card 870. If sufficient funds exist and the selected item is in stock 872, the controller then allows the sale to take place and the balance is written to the card 874. The "AMOUNT LEFT" message is displayed 866 and the card ejection routine is begun. If the card does not have sufficient credit or the selected item was not available, the system would display a message reporting these facts using steps 853, 854, 855, 856, and 857.

In ejecting a card as depicted in FIG. 23, the carriage is moved to the HOME position while reading the VALUE track information to ensure that the balance or OLD.VALUE information was written to the track properly 900. Subsequently, the card positioning assembly moves the card out of the entrance slit 902. If the card is not removed a beeper is sounded to alert the user that the card is available 904. Once the card is removed 906, the system returns to the IDLE mode 750.

Note that if at anytime during the scanning and vending process the shutter is pried open or the card return button is depressed, the process is interrupted and the OLD.VALUE of the card is written to the card. The card is then ejected 899.

In an alternative embodiment, a card swallowing feature is incorporated into the system. In accordance with this aspect of the invention and referring to FIG. 3, a rectangular slot 950 is opened in the rear of the housing 122. A data card 102 may be swallowed by the system by passing it through the card positioner assembly 130 and out of the rear slot 950 into a card collecting basket (not shown). The card swallow option can be used for promotional purposes, for example, promotional cards can be given to customers to enable them to receive a specific product one or more times either for free or at a reduced cost. The nature of the card would be encoded upon the ID track. After the promotional card is used for the promotional purpose, the card is swallowed by the system and an appropriate message is displayed. Thus, the producer can track the purchase patterns of the consumers by collecting the promotional cards and tabulating their geographical distribution.

Another use for the swallow feature is to remove invalid or stolen cards from circulation. If, for instance, the card scanner is used in a credit or debit card validation system, the card number can be compared to a list of invalid or stolen cards. If the card is listed, it is swallowed and an appropriate message is displayed. The same process can be used for removing invalid building access cards from circulation.

In accordance with another aspect of the invention, the major frame components of both the card positioning assembly 130 and the transducer positioning assembly 136 are constructed from injection molded plastic. Substantially all plastic construction keeps manufacturing costs very low.

The data card scanner apparatus and method of this invention has been described above in various embodiments as examples of the principles of the invention, and it should be understood that numerous additional modifications could be made without departing from the scope of this invention as claimed in the following claims.

What is claimed is:

1. Apparatus for scanning a data card which comprises a medium having leading and trailing edges and at least one data stripe formed thereon at a prearranged location and extending transverse to said leading and trailing edges, said apparatus comprising:

card guide means for defining a linear card guide path and having an entrance slit for accepting said data card into said guide path;

first drive means cooperatively associated with said card guide means for driving said data card through said entrance slit and into said card guide means and for positioning said card at a stationary prearranged location;

transducer means for communicating with said at least one data stripe of said data card positioned by said first drive means; and second drive means cooperatively associated with said transducer means for driving said transducer means in a linear manner along said at least one data stripe;

said second drive means comprising a second bidirectional drive means for driving said transducer means alternately in one direction and in an opposite direction such that said data on said at least one data stripe is detected by said transducer means;

wherein said second bi-directional drive means includes:

rotary motor means for rotating a leadscrew;

a threaded nut cooperating with said leadscrew to move in a linear direction along said leadscrew as said leadscrew is rotated by said rotary motor;

a first guide bar mounted parallel to and spaced from said leadscrew;

a second guide bar mounted parallel to and spaced from said leadscrew and in a planar relationship with said first guide bar and said leadscrew; and a carriage supporting said transducer means and fixed to said threaded nut and slidably mounted on said first and second guide bars whereby rotation of said leadscrew by said rotary motor means moves said carriage.

2. Apparatus as claimed in claim 1 wherein said carriage defines first and second cylindrical holes having three protrusions in a equidistant arrangement about the inside of each hole, said protrusions support said carriage on said first and second guide bars.

3. Apparatus as claimed in claim 2 wherein said carriage further includes leaf spring means for supporting said transducer means and biasing said transducer means toward said data card.

4. Apparatus as claimed in claim 3 wherein said transducer means includes at least one magnetic head supported by said carriage adjacent said data stripe.

5. Apparatus as claimed in claim 1 wherein said first drive means further includes means for swallowing said data card.

6. The apparatus of claim 1 wherein said transducer means includes magnetic head means for reading and writing data to said at least one data stripe and circuit means for processing said data read from said data stripe and for transmitting data to said data stripe.

7. Apparatus for scanning a data card which comprises a medium having leading and trailing edges and at least one data stripe formed thereon at a prearranged location and extending transverse to said leading and trailing edges, said apparatus comprising:

card guide means for defining linear card guide path and having an entrance slit for accepting said data card into said guide path;

first drive means cooperatively associated with said card guide means for driving said data card through said entrance slit and into said card guide means and for positioning said card at a stationary prearranged location;

transducer means for communicating with said at least one data stripe of said data card positioned by said first drive means; and second drive means cooperatively associated with said transducer means for driving said transducer means in a linear manner along said at least one data stripe;

said second drive means comprising a second bidirectional drive means for driving said transducer means alternately in one direction and in an opposite direction such that said data on said at least one data stripe is detected by said transducer means;

wherein said first drive means comprises a first bidirectional drive means for driving said data card alternatively in a forward direction to pull said data card through said entrance slit and in a reverse direction to discharge said data card through said entrance slit; and wherein said first bidirectional drive means includes:

a rotary motor means for rotating a drive pulley having an axis of rotation;

a slave pulley having an axis of rotation parallel to said axis of rotation of said drive pulley and positioned in a spaced relation;

a drive belt circumscribing said drive and slave pulleys; and tension pulley means for biasing said drive belt toward said data card having an axis of rotation parallel to said axis of rotation of said drive pulley and positioned about midway between said drive and slave pulleys.

8. Apparatus as claimed in claim 7 wherein said tension pulley means includes a tension pulley mounted on a shaft, said shaft is mounted at each end by spring means for biasing said tension pulley towards said data card.

9. Apparatus as claimed in claim 7 wherein said drive belt includes an inner and outer surface, said outer surface having at least one longitudinal ribs protruding from said surface to interact with said data card.

10. Apparatus as claimed in claim 9 wherein said outer surface of said drive belt has a first longitudinal rib centrally positioned on said outer surface and second and third longitudinal ribs positioned substantially near first and second edges of said outer surface, respectively, said first, second, and third longitudinal ribs are oriented in a parallel spaced relationship.

11. Apparatus as claimed in claim 10 wherein said spacing between said ribs is sufficient to enable raised lettering on a credit card to fit between said ribs.

12. Apparatus as claimed in claim 7 includes a shutter means being operated by said rotary motor means for controlling access to said entrance slit.

13. Apparatus as claimed in claim 12 wherein said slave pulley is fixedly mounted on a shaft, and wherein said shutter means includes a disk of ferrous material fixedly attached to and circumscribing said shaft, a shutter covering said card guide path attached to first and second parallel arm portions, said arm portions being rotatably mounted to said shaft such that said shutter opens and closes access to said card guide path, a magnet is attached to said second arm portion and is positioned in a parallel, facing relation with said disk such that magnetic flux from said magnet couples to said disk and said magnet will move in conjunction with said disk when said shaft rotates said disk.

14. Apparatus for scanning a data card which comprises a medium having leading and trailing edges and at least one data stripe formed thereon at a prearranged location and extending transverse to said leading and trailing edges, said apparatus comprising;
card guide means for defining a linear card guide path and having an entrance slit for accepting said data card into said guide path;
first drive means cooperatively associated with said card guide means for driving said data card through said entrance slit and into said card guide means and for positioning said card at a stationary prearranged location;
transducer means for communicating with said at least one data stripe of said data card positioned by said first drive means; and
second drive means cooperatively associated with said transducer means for driving said transducer means in a linear manner along said at least one data stripe;
said second drive means comprising a second bidirectional drive means for driving said transducer means alternately in one direction and in an opposite direction such that said data on said at least one data stripe is detected by said transducer means;
wherein said card guide means includes pressure plate means for biasing said data card toward said transducer means.

15. Apparatus as claimed in claim 14 wherein said pressure plate means includes a first and second ski-shaped elements and first and second spring means for independently biasing each of said ski-shaped elements against said data card.

16. Apparatus as claimed in claim 13 further including sensing means to detect when said shutter is open.

17. Apparatus for scanning a data card which comprises a medium having leading and trailing edges and at least one data stripe formed thereon at a prearranged location and extending transverse to said leading and trailing edges, said apparatus comprising:
card guide means for defining a linear card guide path and having an entrance slit for accepting Said data card into said guide path;
first drive means cooperatively associated with said card guide means for driving said data card through said entrance slit and into said card guide means and for positioning said card at a stationary prearranged location;
transducer means for communicating with said at least one data stripe of said data card positioned by said first drive means; and
second drive means cooperatively associated with said transducer means for driving said transducer means in a linear manner along said at least one data stripe;
said second drive means comprising a second bidirectional drive means for driving said transducer means alternately in one direction and in an opposite direction such that said data on said at least one data stripe is detected by said transducer means;
first sensor means for detecting when a data card is inserted into said entrance slit; and
second sensor means for detecting when said data card has reached said prearranged location within said card guide means.

18. Apparatus for scanning a data card which comprises a medium having leading and trailing edges and at least one data stripe formed thereon at a prearranged location and extending transverse to said leading and trailing edges, said apparatus comprising:
card guide means for defining a linear card guide path and having an entrance slit for accepting said data card into said guide path;
first drive means cooperatively associated with said card guide means for driving said data card through said entrance slit and into said card guide means and for positioning said card in a stationary prearranged location;
transducer means for communicating with said at least one data stripe of said data card positioned by said first drive means;
second drive means cooperatively associated with said transducer means for driving said transducer means in a linear manner along said at least one data stripe;
said second drive means comprising a second bidirectional drive means for driving said transducer means alternately in one direction and in an opposite direction such that said data on said at least one data stripe is detected by said transducer means; and
said card guide means includes pressure plate means for biasing said data card within said card guide path toward said transducer means having first and second ski-shaped elements and first and second spring means for independently biasing each of said ski-shaped elements against said data card.

19. Apparatus as claimed in claim 18 wherein said first drive means comprises a bi-directional drive means for driving said data card alternatively in a forward direction to pull said data card through said entrance slit and in a reverse direction to discharge said data card through said entrance slit.

20. Apparatus as claimed in claim 19 wherein said first bidirectional drive means includes:
a rotary motor means for rotating a drive pulley having an axis of rotation;
a slave pulley having an axis of rotation parallel to said axis of rotation of said drive pulley and positioned in a spaced relation;
a drive belt circumscribing said drive and slave pulleys; and
tension pulley means for biasing said drive belt toward said data card having an axis of rotation parallel to said axis of rotation of said drive pulley and positioned essentially midway between said drive and slave pulleys.

21. Apparatus as claimed in claim 20 wherein said tension pulley means includes a tension pulley mounted on a shaft, said shaft is mounted at each end by spring means for biasing said tension pulley towards said data card.

22. Apparatus for scanning a data card which comprises a thin, flexible medium having leading and trailing edges and at least one data stripe formed thereon at a prearranged location and extending transverse to said leading and trailing edges, said apparatus comprising:
card guide means for defining a linear card guide path and having an entrance slit for accepting said data card into said guide path;
first drive means cooperatively associated with said card guide means for driving said data card through said entrance slit and into said card guide means and for positioning said card in a stationary prearranged location;

transducer means for communicating with said at least one data stripe of said data card positioned by said first drive means;

second drive means cooperatively associated with said transducer means for driving said transducer means in a linear manner along said at least one data stripe; and shutter means being operated by said first drive means for controlling access to said entrance slit.

23. Apparatus for scanning a data card which comprises a thin, flexible medium having leading and trailing edges and at least one data stripe formed thereon at a prearranged location and extending transverse to said leading and trailing edges, said apparatus comprising:

card guide means for defining a linear card guide path and having an entrance slit for accepting said data card into said guide path;

first drive means cooperatively associated with said card guide means for driving said data card through said entrance slit and into said card guide means and for positioning said card in a stationary prearranged location;

transducer means for communicating with said at least one data stripe of said data card positioned by said first drive means;

second drive means cooperatively associated with said transducer means for driving said transducer means in a linear manner along said at least one data stripe;

said second drive means comprising a second bidirectional drive means for driving said transducer means alternately in one direction and in an opposite direction such that said data on said at least one data stripe is detected by said transducer means; and shutter means being operated by said first drive means for controlling access to said entrance slit.

24. Apparatus as claimed in claim 23 wherein said first bidirectional drive means includes:

a rotary motor means for rotating a drive pulley having an axis of rotation;

a slave pulley having an axis of rotation parallel to said axis of rotation of said drive pulley and positioned in a spaced relation;

a drive belt circumscribing said drive and slave pulleys; and tension pulley means for biasing said drive belt toward said data card having an axis of rotation parallel to said axis of rotation of said drive pulley and positioned about midway between said drive and slave pulleys.

25. Apparatus as claimed in claim 24 wherein said slave pulley is fixedly mounted on a shaft and wherein said shutter means includes a disk of ferrous material fixedly attached to and circumscribing said shaft, a shutter covering said card guide path attached to first and second parallel arm portions, said arm portions being rotatably mounted to said shaft such that said shutter opens and closes access to said card guide path, a magnet is attached to said second arm portion and circumscribes said shaft and is positioned in a parallel, facing relation with said disk such that magnetic flux from said magnet couples to said disk and said magnet will rotate in conjunction with said disk when said shaft rotates said disk.

26. Apparatus as claimed in claim 25 further including sensing means to detect when said shutter is open.

* * * * *